United States Patent
Ahn

(10) Patent No.: US 9,706,343 B2
(45) Date of Patent: Jul. 11, 2017

(54) GLASSES-TYPE TERMINAL, AND SYSTEM INCLUDING GLASSES-TYPE TERMINAL AND SIGNAGE

(71) Applicant: LG ELECTRONICS INC., Seoul (KR)

(72) Inventor: Yongki Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/111,716

(22) PCT Filed: Apr. 30, 2014

(86) PCT No.: PCT/KR2014/003886
§ 371 (c)(1),
(2) Date: Jul. 14, 2016

(87) PCT Pub. No.: WO2015/108241
PCT Pub. Date: Jul. 23, 2015

(65) Prior Publication Data
US 2016/0345124 A1    Nov. 24, 2016

(30) Foreign Application Priority Data
Jan. 15, 2014 (KR) ........................ 10-2014-0005243

(51) Int. Cl.
*H04W 4/00* (2009.01)
*H04B 5/02* (2006.01)
*H04B 1/3827* (2015.01)
*G02B 27/01* (2006.01)

(52) U.S. Cl.
CPC .......... *H04W 4/008* (2013.01); *G02B 27/017* (2013.01); *H04B 1/385* (2013.01); *H04B 5/02* (2013.01); *G02B 2027/014* (2013.01); *G02B 2027/0138* (2013.01); *G02B 2027/0178* (2013.01); *H04B 2001/3866* (2013.01)

(58) Field of Classification Search
CPC .................................................... H04W 4/008
See application file for complete search history.

(56) References Cited

U.S. PATENT DOCUMENTS

2013/0127737 A1* 5/2013 Shneidman ............. G06F 3/041
345/173

FOREIGN PATENT DOCUMENTS

| JP | 2006-258591 A | | 9/2006 | |
| JP | 2006258591 | * | 9/2006 | ............. G01C 21/00 |
| JP | 2013-205218 A | | 10/2013 | |
| KR | 10-2006-0034350 A | | 4/2006 | |
| KR | 10-2013-0077927 A | | 7/2013 | |

* cited by examiner

*Primary Examiner* — Tuan H Nguyen
(74) *Attorney, Agent, or Firm* — Birch, Stewart, Kolasch & Birch, LLP

(57) ABSTRACT

The present invention a digital signage providing preset information and glasses-type terminal capable of wireless communication, wherein the glasses-type terminal includes a wireless communication unit performing wireless communication and a control unit, which performs a control method including the steps of: transmitting unique information on the glasses-type terminal to the digital signage, in the vicinity of the digital signage that is preset; receiving data based on the unique information; and controlling the output unit of the glasses-type terminal to output the data.

11 Claims, 26 Drawing Sheets

(a)

(b)

GLASSES-TYPE TERMINAL, AND SYSTEM INCLUDING GLASSES-TYPE TERMINAL AND SIGNAGE

CROSS REFERENCE TO RELATED APPLICATIONS

This application is the National Phase of PCT International Application No. PCT/KR2014/003886, filed on Apr. 30, 2014, which claims priority under 35 U.S.C. 119(a) to Patent Application No. 10-2014-0005243, filed in Republic of Korea on Jan. 15, 2014, all of which are hereby expressly incorporated by reference into the present application.

BACKGROUND OF THE INVENTION

Field of the Invention

The present invention relates to a glasses type terminal capable of wirelessly communicating with a digital signage.

Description of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Efforts are ongoing to support and increase the functionality of mobile terminals. Such efforts include software and hardware improvements, as well as changes and improvements in the structural components. Recently, wearable terminals that can be worn on part of users' body to provide information to users have been developed.

Recently, people are provided with information through various mediums, as well as users' personal terminals. People may be provided with information against their will, and as an amount of provided information is increased, it is difficult for a user to selectively receive desired information.

For example, people may be provided with information by a digital signage installed on the road. The digital signage is a communication tool inducing marketing advertisement of enterprises and client experience. The digital signage is installed in various places such as an airport, a hotel, a stop, and the like, to provide specific information as well as a broadcast program.

Various people are simultaneously provided with the same information output from a digital signage. Thus, it is difficult to provide specified information to different individuals and unnecessary information may be considered noise.

SUMMARY OF THE INVENTION

An aspect of the present invention is to provide data collected from a digital signage to a user through a glasses type terminal.

According to an aspect of the present invention, a glasses type terminal capable of wirelessly communicating with a digital signage collecting state information of a proximity area by an input sensor thereof providing at least one of visual information and audible information, may include: a wireless communication unit and a control unit, wherein the control unit executes a control method including: receiving the state information when the glasses type terminal is positioned in the proximity area; receiving data based on the state information; and controlling the glasses type terminal on the basis of the data.

In an embodiment related to the present invention, the state information may be a noise state of the proximity area, the data may be audible data canceling out the noise state, and the glasses type terminal may further include: a speaker outputting the audible data.

In an embodiment related to the present invention, the state information may be an image obtained by imaging a proximity area including the glasses type terminal, and the data may correspond to at least one region of the visual information.

In an embodiment related to the present invention, the glasses type terminal may further include: a camera imaging an external environment in a direction of a user's gaze, wherein the control unit may control the wireless communication unit to transmit information regarding one region of the visual information not sensed by the camera to the digital signage.

In an embodiment related to the present invention, when audible information is output from the digital signage, the data may be the audible information transmitted on the basis of the image, and the control unit may control an output unit to output the audible information.

In an embodiment related to the present invention, the glasses type terminal may further include: a display unit outputting the state information when the data is received.

According to another aspect of the present invention, a wireless communication system including a digital signage and a glasses type terminal, may include: a digital signage defining a preset proximity area and collecting state information of the proximity area; a glasses type terminal entering the proximity area and performing wireless communication with the digital signage; and a communication unit transmitting data based on the state information from the digital signage to the glasses type terminal.

In an embodiment related to the present invention, the digital signage may include at least one of a camera imaging an external environment, a microphone sensing ambient noise, a humidity sensor sensing humidity, a temperature sensor measuring a temperature, and an illumination sensor sensing incident light.

In an embodiment related to the present invention, when the digital signage outputs audible information, if the ambient noise is sensed to have a preset sound volume or greater, the data may correspond to the audible information.

In an embodiment related to the present invention, when the digital signage outputs visual information, if a portion of the glasses type terminal included in the image is covered by an object, the data may correspond to at least one region of the visual information.

In an embodiment related to the present invention, the digital signage may include a location information module sensing an area in which the digital signage is positioned, and the digital signage may wirelessly communicate with another digital signage positioned in an area spaced apart from the digital signage to transmit the state information and position information.

In an embodiment related to the present invention, the glasses type terminal may include unique information formed by a user and transmit the unique information to the digital signage, and the digital signage may transmit a portion of the state information to the glasses type terminal by using the unique information.

In the glasses type terminal according to an embodiment of the present invention, since state information regarding an area in the vicinity of a digital signage collected by the digital signage is received, information of the corresponding area can be recognized.

Also, in a case in which a user of a glasses type terminal receives information of a digital signage, the user may be provided with data formed according to the state information and related to the information together. Thus, output of the information is complemented by the received information, whereby the user may be provided with information of the digital signage with enhanced quality.

DETAILED DESCRIPTION OF THE EMBODIMENTS

Figure 1:
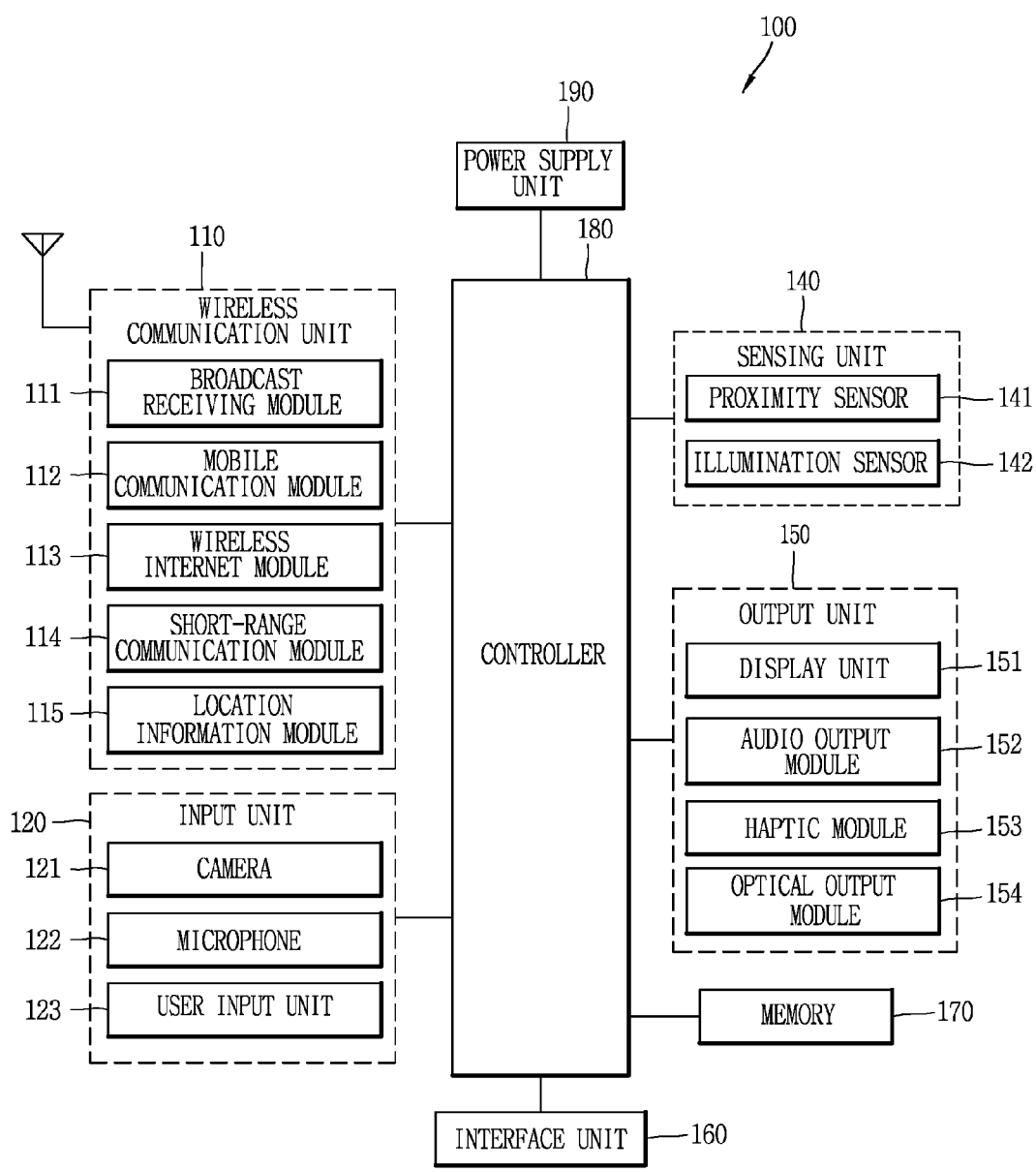
FIG. 1 is a block diagram of a mobile terminal related to an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIG. 1, where FIG. 1 is a block diagram of a mobile terminal in accordance with the present invention.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1, or activating application programs stored in the memory 170. As one example, the control unit 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glasses type terminal according to various embodiments to be explained later. The operation or the control method of the glasses type terminal may be implemented on the glasses type terminal by driving at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch control unit. The touch control unit may process the received signals, and then transmit corresponding data to the control unit 180. Accordingly, the control unit 180 may sense which region of the display unit 151 has been touched. Here, the touch control unit may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image is displayed on the stereoscopic display unit 152 by a stereoscopic processing unit 152a. The stereoscopic processing unit may receive the 3D image and extract the left image and the right image, or may receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Meanwhile, beyond a level at which a user holds a mobile terminal in hand to use it, a mobile terminal may extend to a wearable device that can be worn on a human body. The wearable device may include a smart watch, a smart glass, a head mounted display (HMD), and the like. Hereinafter, examples of a mobile terminal extending to a wearable device will be described.

A wearable device may be configured to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
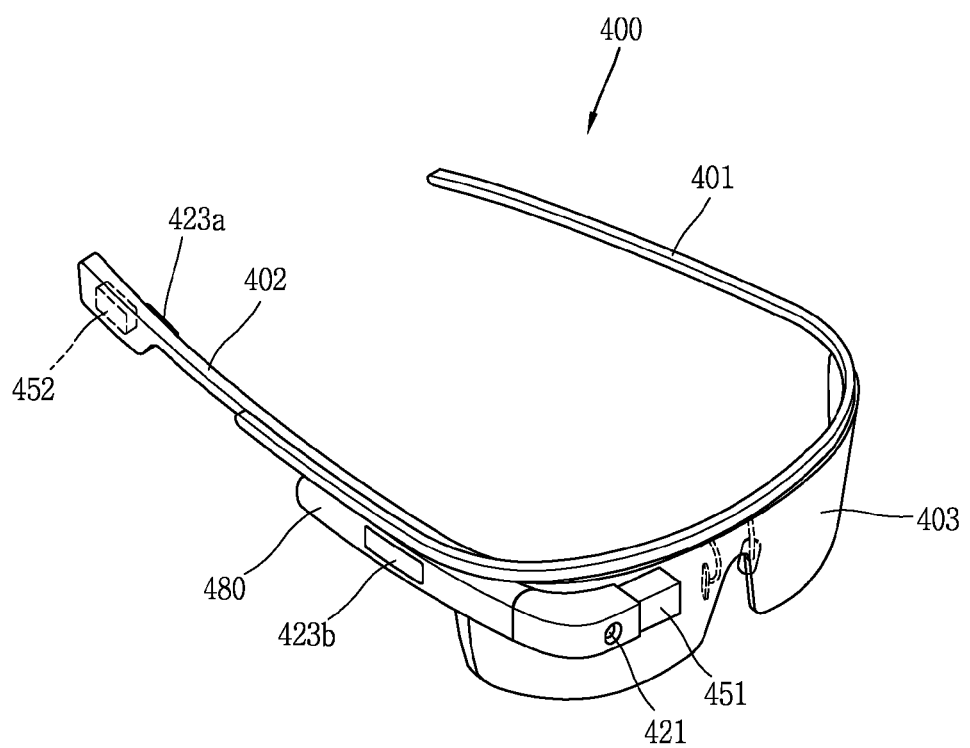
FIG. 2 is a perspective view illustrating an example of a glasses type terminal 400 related to another embodiment of the present invention.

FIG. 2 is a perspective view illustrating an example of a glasses type terminal 400 related to another embodiment of the present invention.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned control unit 180. FIG. 2 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 2 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Hereinafter, a communication system that can be performed through the mobile terminal 100 according to the present invention will be described.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station control units (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB(Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the control unit may execute a browser (e.g., Internet browser). If the data received from the external tag is a text type, the control unit may execute a text viewer. If the data received from the external tag is a URI type, the control unit may execute a browser or originate a call. If the data received from the external tag is a general control type, the control unit may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the control unit 180 of the mobile terminal.

The foregoing embodiments are merely exemplary and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

Figure 3:
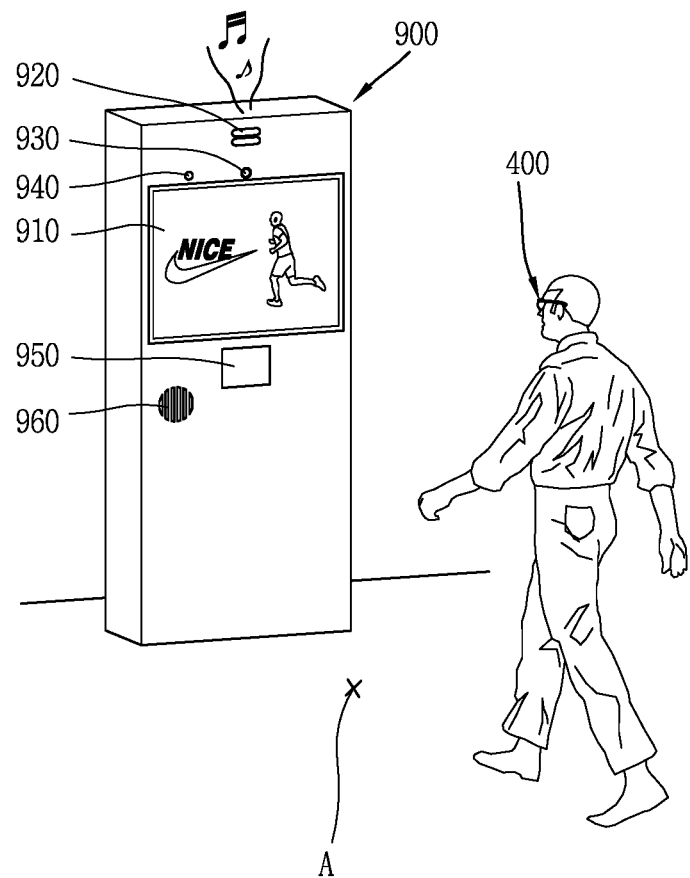
FIG. 3 is a conceptual view illustrating a system including a glasses type terminal wirelessly communicating with a digital signage.

FIG. 3 is a conceptual view illustrating a system including a glasses type terminal wirelessly communicating with a digital signage. The digital signage wirelessly communicating with the glasses type terminal according to an embodiment of the present invention continuously outputs preset specific information. The digital signage 900 includes a display unit 910 outputting visual information, a speaker 920 outputting audible information, a camera 930 imaging a front side of the digital signage 900, a sensor unit 940 collecting information regarding a surrounding environment of the digital signage 900, an input device 950 for inputting a control command to the digital signage 900 (hereinafter, simply referred to as a "signage"), and a microphone 960 receiving an external sound.

The display unit 910 may output preset visual information, and the speaker 920 outputs preset audible information. Also, the display unit 910 may be controlled to output visual information on the basis of a control command applied to the input device 950 and the display unit 910.

The camera 920 may sense an external environment in front of the signage 900 in real time. Also, the camera 920 may be controlled to image the external environment on the basis of a control command applied by the user or from the outside.

The sensor unit 940 may include various sensors. For example, the sensor unit 940 may include at least one of a temperature sensor, a humidity sensor, a light sensor, and sensors for sensing an ultraviolet ray or fine dust. The sensor unit 940 may update the surrounding environment of the signage 900 continuously or at a preset time interval.

A user may be provided with specific information without having to input a signal through the digital signage 900 or may receive desired information by applying a control command.

A communication unit of the signage 900 performs wireless communication with the wireless communication unit 110 of the glasses type terminal 400 which has entered a proximity area A. Here, however, on the basis of a user setting, the control unit 180 may restrict wireless communication with the signage 900 even though the glasses type terminal 400 enters the proximity area A.

The control unit 180 may receive data provided from the signage 900 or transmit unique information of the glasses type terminal 400, information stored in the memory 160, or a user's control command to the signage 900.

Here, even though the signage 900 may transmit data stored in the signage 900 to the glasses type terminal 400, but the present invention is not limited thereto. For example, the glasses type terminal 400 may transmit data from a preset server on the basis of a control signal transmitted from the signage 900.

Hereinafter, a control method of the glasses type terminal 400 wirelessly communicating with the signage 900 will be described through various embodiments.

Figure 4:
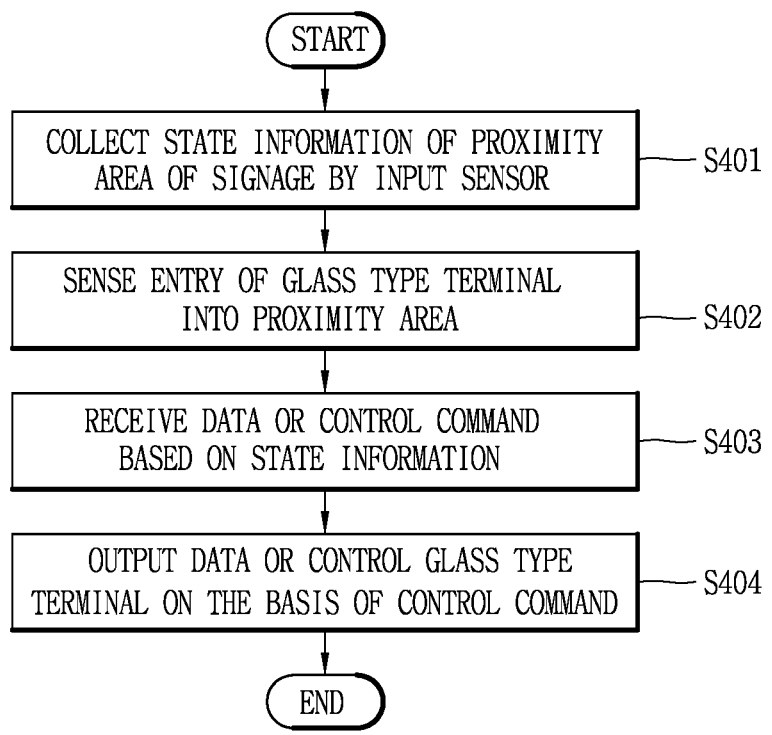
FIG. 4 is a flow chart illustrating a control method of a glasses type terminal 400 according to an embodiment of the present invention.
Figure 5A:
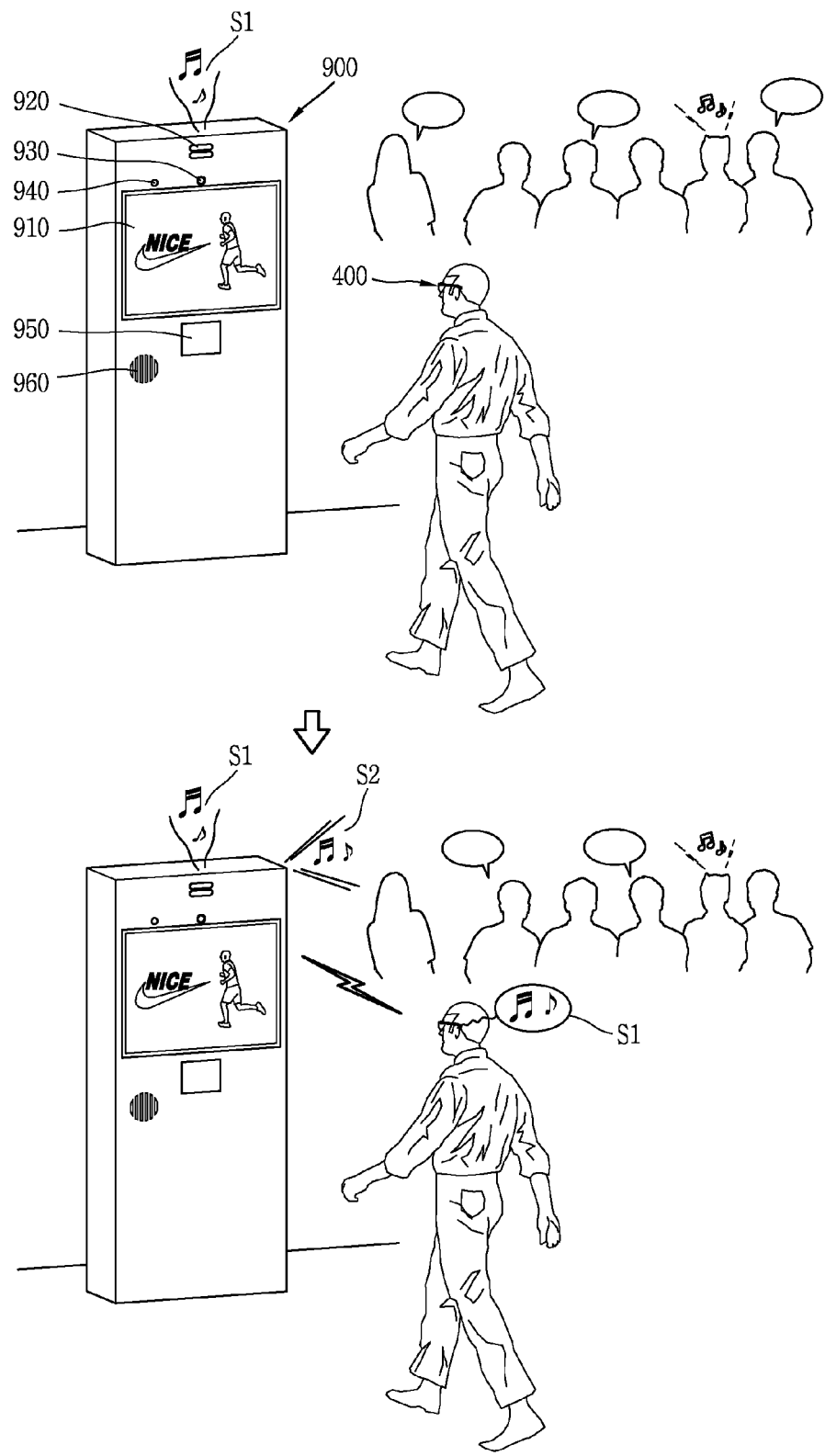
FIGS. 5A to 5C are conceptual views illustrating the control method of FIG. 4.

FIG. 4 is a flow chart illustrating a control method of a glasses type terminal 400 according to an embodiment of the present invention, and FIG. 5A is a conceptual view illustrating the control method of FIG. 4 according to an embodiment.

State information of the proximity area A of the signage is collected by an input sensor (S401). Here, the input sensor is a component forming the signage 900 and receiving various types of state information. For example, the input sensor may be at least one of the sensor unit 940, the camera 930 imaging an external environment, and the microphone 960 receiving an external sound.

It is detected that the user who wears the glasses type terminal 400 has entered the proximity area A (S402). For example, when the signage 900 is sensed by the camera 42, the control unit 180 may transmit a specific signal to the signage 900 and the signage 900 may perform wireless communication with the glasses type terminal 400 on the basis of the specific signal.

Alternatively, when it is detected by the location information module 115 that a position of the glasses type terminal 400 is close to a previously stored position of the signage 900, the control unit 180 may control the wireless communication unit 110 such that the glasses type terminal 400 and the sensed signage 900 perform wireless communication with each other.

Alternatively, when the glasses type terminal 400 positioned in front of the signage 900 is sensed by the camera 930 of the signage 900, the signage 900 may perform wireless communication with the glasses type terminal 400.

Alternatively, in a case in which communication to be detected in an area within a designated distance has been set, when the glasses type terminal 400 is positioned in the proximity area A, the wireless communication unit of the glasses type terminal 400 may access the communication to perform wireless communication with the signage 900.

That is, in a case in which it is anticipated that the user will detect information output from the signage 900 by the glasses type terminal 400 or the signage 900, the control unit 180 may control the wireless communication unit 110 of the glasses type terminal 400 to perform wireless communication with the signage 900.

The glasses type terminal 400 receives data based on the statue information or a control command (S403). The control unit 180 controls the output unit 150 to output the received data or controls the glasses type terminal 400 on the basis of the control command (S404).

Referring to FIG. 5A, the signage 900 outputs specific information. The information may be visual information output through the display unit 910 and audible information S1 output through the speaker 920.

The signage 900 collects state information regarding an external environment at a preset position. For example, the microphone 960 may continuously receive ambient noise. For example, the signage 900 may store state information regarding a degree of noise or a type of noise at a specific time. The signage 900 receives sounds of passersby, noise generated by vehicles, a sound of a song provided from a specific area to generate state information regarding noise.

When the glasses type terminal 400 enters the proximity area A of the signage 900, the control unit 180 receives noise-cancellation data S2 canceling noise. The noise-cancellation data S2 is formed by the state information related to noise collected by the signage 900.

While the audible information S1 output from the signage 900 is being output, the control unit 180 controls the speaker 452 to output the noise-cancellation data S2. Thus, the user may be provided with the audible information S1 with high quality in a state in which noise around the signage 900 is blocked.

According to the present embodiment, when the user enters the proximity area of the signage 900, the user receives data for receiving audible information with high quality provided from the signage 900. Thus, the user may receive information provided from the signage 900, with high quality.

Figure 5B:
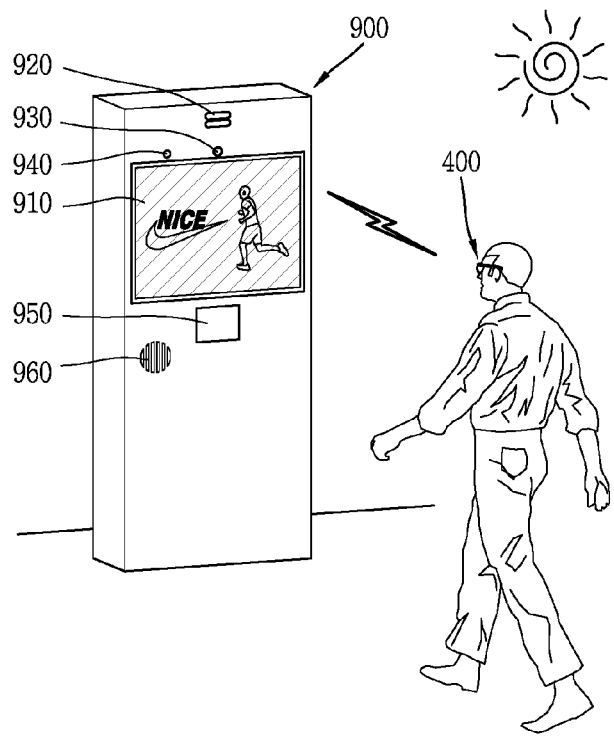
Figure 5B:
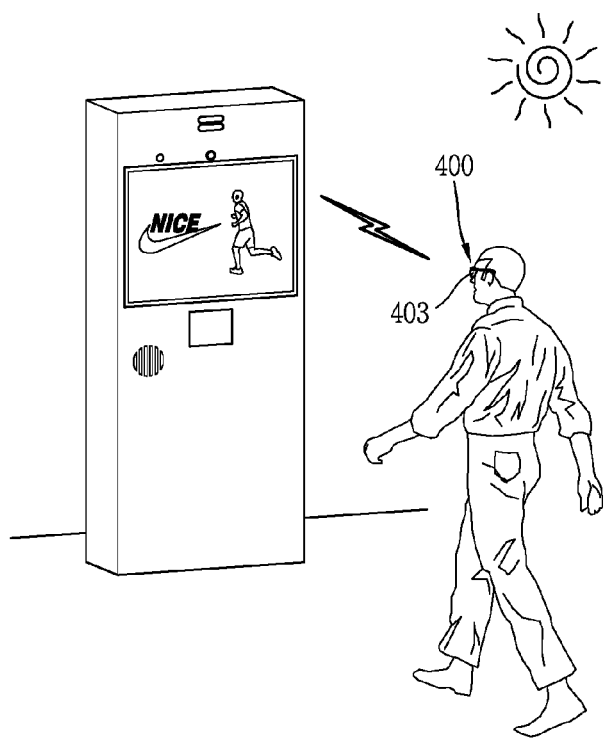
Figure 5C:
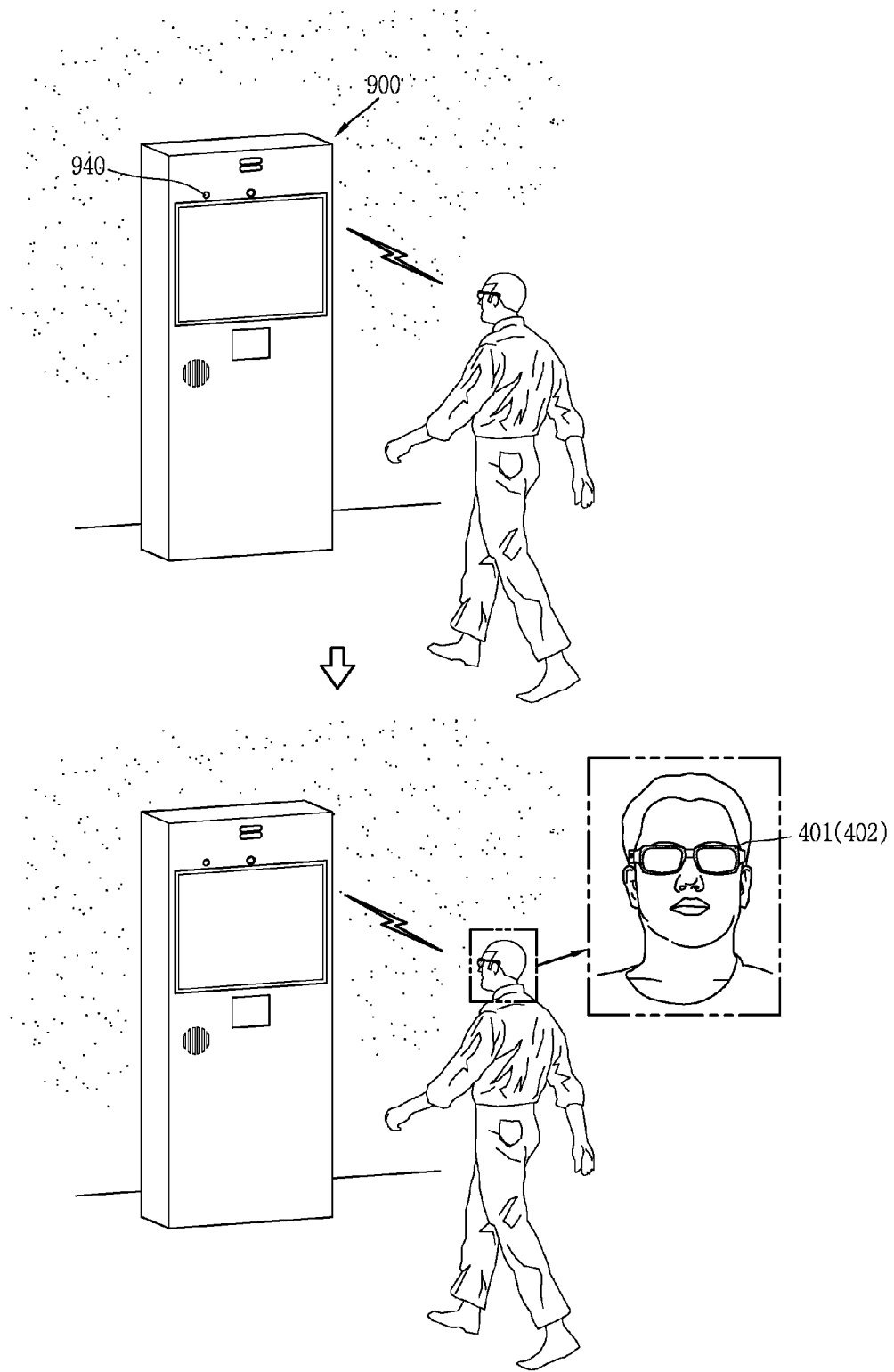

FIGS. 5B and 5C are conceptual views illustrating a control method of the glasses type terminal 400 on the basis of a control command according to collected state information.

Referring to FIG. 5B, the sensor unit 940 of the signage 900 senses light reaching the signage 900. The glasses type terminal 400 may control a lens 403 on the basis of sensed light.

For example, in a case in which a large amount of light reaches the signage 900, the glasses type terminal 400 receives a control command for adjusting transparency of the lens 403. That is, since transparency of the lens 403 is adjusted on the basis of the control command, the control unit 180 may clearly sense visual information output on the display unit.

Also, referring to FIG. 5C, in a case in which the signage 900 is positioned in an indoor area, the sensor unit 940 of the signage 900 senses a temperature of the area in which the signage 900 is positioned, and stores current external weather.

In a case in which a temperature difference between the indoor area and an outdoor area is equal to or higher than a preset temperature, the glasses type terminal 400 may receive a control command for driving a heat wire formed in at least one of a first frame 401 and a second frame 402.

That is, on the basis of the control command, the control unit 180 may increase a temperature of the first and second frames 401 and 402 of the glasses type terminal 400 and prevent a phenomenon in which the lens 403 is foggy.

Figure 6A:
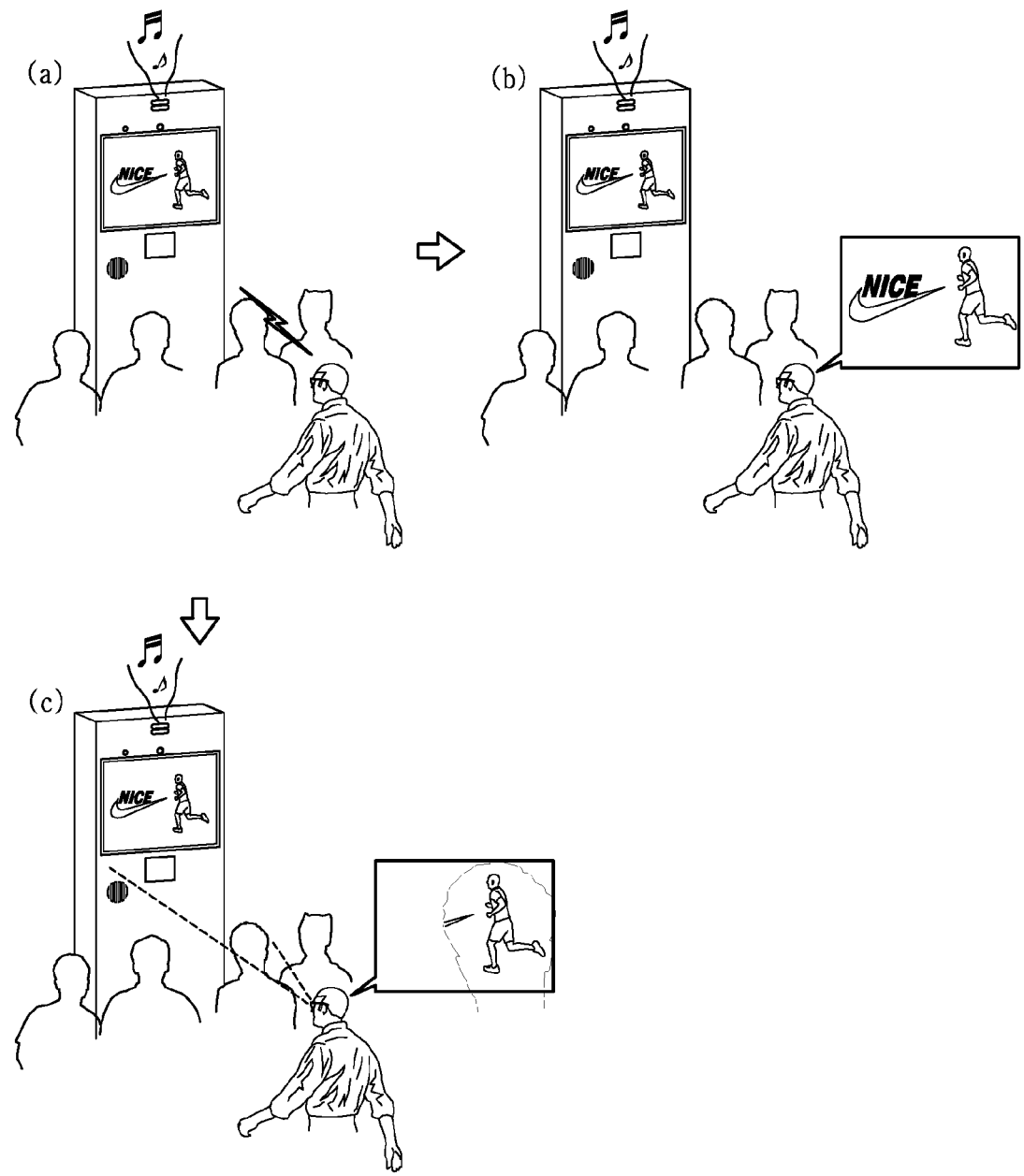
FIGS. 6A and 6B are conceptual views illustrating a control method for outputting data generated on the basis of state information.
Figure 6B:
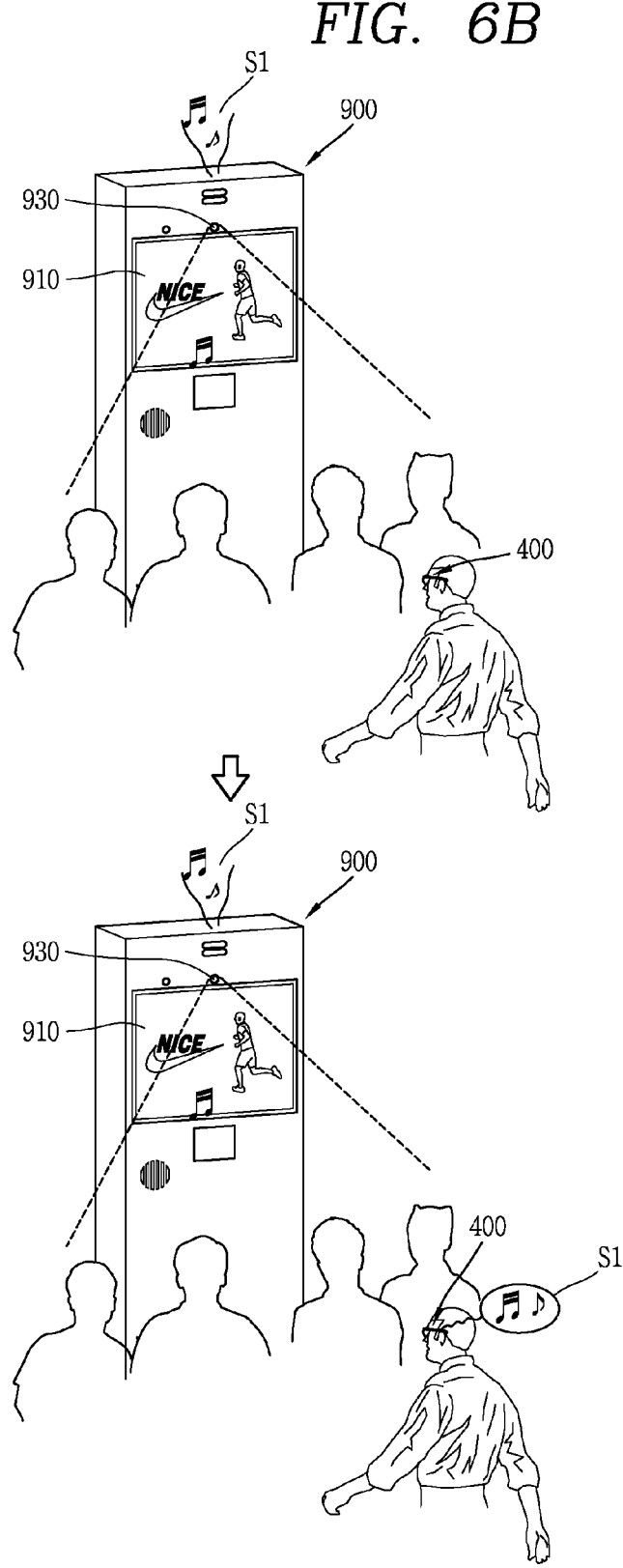

FIGS. 6A and 6B are conceptual views illustrating a control method for outputting related data generated on the basis of state information.

Referring to FIG. 6A, the display unit 910 outputs specific visual information. Also, the speaker 920 may output specific audible information. A plurality of people are present in front of the signage 900. (a) of FIG. 6A illustrates a situation in which a portion of visual information output on the signage 900 is covered by people so the user is not provided with portion of the visual information.

The control unit 180 controls the wireless communication unit 110 to receive related data of the visual information from the signage 900.

Referring to (b) of FIG. 6A, the glasses type terminal 400 receives the entirety of visual information from the signage 900. The control unit 180 may control the display unit 451 to receive the visual information from the signage 900 in real time and output the same.

Alternatively, the control unit 180 may receive the entirety of specific visual information from the signage 900 at a time, and control the display unit 451 to output the received specific visual information according to a current output state of the display unit of the signage 900.

Accordingly, even when the display unit of the signage 900 is covered by a front person of the user, the user may be provided the specific visual information through the display unit 451 and may be provided with entire data provided from the signage 900, even without separately receiving output sound information.

Referring to (c) of FIG. 6A, the glasses type terminal 400 outputs a portion of the visual information, as data.

The camera 930 of the signage 900 may image a front side of the signage 900, while the visual information is being output on the display unit 910. The signage 900 extracts the covered glasses type terminal 400 from the captured image of the external environment. The signage 900 transmits a portion of visual information to the glasses type terminal 400.

For example, the signage 900 may transmit a wireless signal to the glasses type terminal 400 sensed by the camera 930. in response to the wireless signal, the glasses type terminal 400 may transmit information regarding the region of the visual information covered by a person (or an object) to the signage 900. The signage 900 may generate data to be transmitted to the glasses type terminal 400 on the basis of the information.

Alternatively, the camera 421 of the glasses type terminal 400 may first obtain a shape of a person (or an object) which is positioned in front of the user and covers the display unit 910 of the signage 900. The control unit 180 transmits information regarding the obtained shape to the signage 900. The signage 900 transmits a portion of visual information corresponding to the region covered by the person (or object), as data.

The control unit 180 controls the display unit 451 to output the received data in a region in which the person (or object) is positioned. The display unit 451 is controlled to output the data on the basis of the user's position in relation to the signage 900.

Also, when it is sensed by the camera 930 that a plurality of people are positioned on a front side, the camera 930 may transmit visual information, as data, output from the display unit 910 to each of glasses type terminals 400.

Accordingly, the user may receive visual information actually output through the display unit 910 of the signage 900 in one region and data output through the display unit 451 in the other region, thus receiving visual information, output from the signage 900.

FIG. 6B is a conceptual view illustrating a control method for receiving and outputting data related to sound information.

In (a) of FIG. 6B, the camera 920 of the signage 900 images a front side of the signage 900. When it is analyzed that a preset number of people are positioned on the front side, the signage 900 transmits the audible information as data to the glasses type terminal 400.

The glasses type terminal 400 receives the data from the signage 900. Also, the glasses type terminal 400 may receive a control command for controlling a reproduction state (or a play state) of the data. Accordingly, the control unit 180 may control the speaker 452 of the glasses type terminal 400 to output the data in the substantially same manner as that of playing the audible information output from the speaker 920 using the control command and the data.

However, the control unit 180 may control the speaker 452 of the glasses type terminal 400 to restrict output of the received data on the basis of a user setting or a control command.

Also, the signage 900 may extract a glasses type terminal 400 worn on by a person covered by an obstacle (a person or an object) among people sensed by the camera, and selectively transmit data only to the extracted glasses type terminal 400.

That is, even though the glasses type terminal 400 does not separately request data from the signage 900, the signage 900 itself may sense a state of the glasses type terminal 400 and transmit required data to the glasses type terminal 400. Thus, the glasses type terminal 400 may be provided with information with enhanced quality output from the signage 900.

Figure 7:
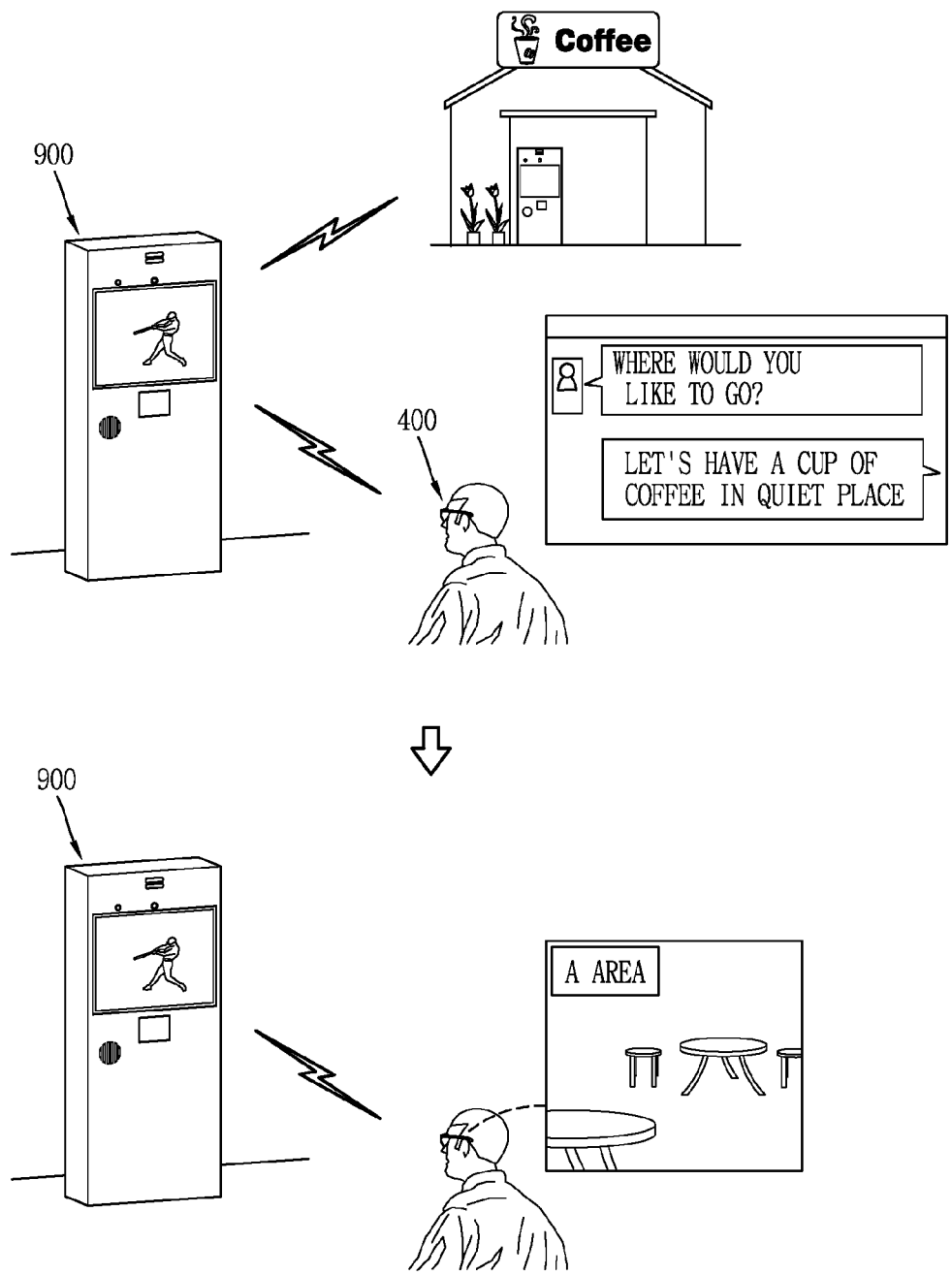
FIG. 7 is a conceptual view illustrating a system for providing state information collected from a signage 900 to the glasses type terminal 400.

FIG. 7 is a conceptual view illustrating a system for providing state information collected from the signage 900 to the glasses type terminal 400. Referring to FIG. 7, a plurality of signages 900 positioned in different areas may wireless communicate with each other, and information collected by each of the signages 900 may be transmitted to another signage 900 as necessary.

An area in which the signages 900 are positioned is not limited. For example, the signages 900 may be positioned in a store, a restaurant, a bookstore of a building or in an interior of a subway station, or may be positioned in the vicinity of a stop or a road. Each of the signages 900 collects state information of each position.

When it is sensed that the glasses type terminal 400 is positioned in the proximity area, the signage 900 is provided with data appropriate for the glasses type terminal 400.

Here, the appropriate data may be determined by a user's voice command. For example, the microphone 960 of the signage 900 receives a voice command by the user. When the user inputs a voice command of "quiet coffee shop", the signage may extract "quiet coffee shop" in a signage 900 positioned in a coffee shop. Whether the coffee shop is a quiet coffee shop is based on state information collected by each of the signages 900.

For example, the signages 900 positioned in a proximity area of the glasses type terminal 400 transmit data corresponding to position and state information of a signage 900 positioned in a coffee shop with the smallest number of people in images of the interiors of the coffee shops collected by the respective signages 900 to the glasses type terminal 400.

Here, the appropriate data may be determined by history information recorded in the glasses type terminal 400. For example, in a case in which message information is stored in another mobile terminal of the user interworking with the glasses type terminal 400, the control unit 180 may control the wireless communication unit 110 to transmit a portion of the message information to the signage 900 positioned in the proximity area.

For example, when the glasses type terminal 400 enters a proximity area of a specific signage 900, the glasses type terminal 400 may extract information corresponding to an area from the message information and transmit the extracted information to the signage 900. For example, the glasses type terminal 400 may transmit information regarding "coffee" and "let's have" to the signage 900.

On the basis of the information received from the glasses type terminal 400, the signage 900 transmits a portion of data collected by each of the signages 900 to the glasses type terminal 400. For example, a portion of the data may be an image captured by a camera of a specific signage 900, noise recorded by a speaker.

The control unit 180 controls the output unit 150 to output the data received from the signage 900. For example, the control unit 180 controls the display unit 451 to output the image.

Accordingly, the user may be easily provided with the state information collected in relation to the specific position.

Figure 8:
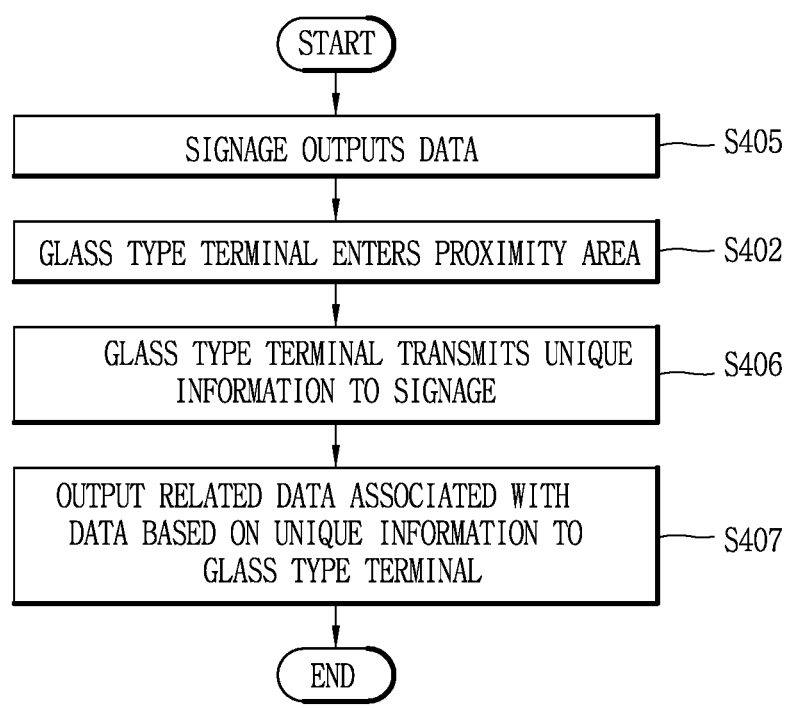
FIG. 8 is a conceptual view illustrating a control method of a glasses type terminal 400 wirelessly communicating with a signage 900 according to another embodiment of the present invention.

FIG. 8 is a conceptual view illustrating a control method of the glasses type terminal 400 wirelessly communicating with the signage 900 according to another embodiment. The signage 900 outputs data (S405), and the signage 900 or the glasses type terminal 400 senses another glasses type terminal which has entered a proximity area of the signage 900 (S402).

The glasses type terminal 400 which has entered the proximity area A transmits unique information of the glasses type terminal 400 to the signage 900 (S406). Here, the unique information of the glasses type terminal 400 refers to specific information identifying the glasses type terminal 400. For example, the specific information may be a serial number of the glasses type terminal 400, personal information of the user of the glasses type terminal 400, or a unique number of the glasses type terminal 400 for communication.

For example, when a time duration in which the glasses type terminal 400 is positioned in the proximity area A is equal to or greater than a preset reference period of time, the wireless communication unit 110 may be controlled to transmit the unique information to the signage 900.

The signage 900 transmits related data associated with the data on the basis of the unique information and the glasses type terminal 400 outputs the related data (S407). The related data associated with the data may be transformed data obtained by transforming the data to a form appropriate for the user of the glasses type terminal 400 or additional data anticipated to be required for the user, but the present invention is not limited thereto. Hereinafter, a control method of the present invention will be described with reference to a specific embodiment.

Figure 9A:
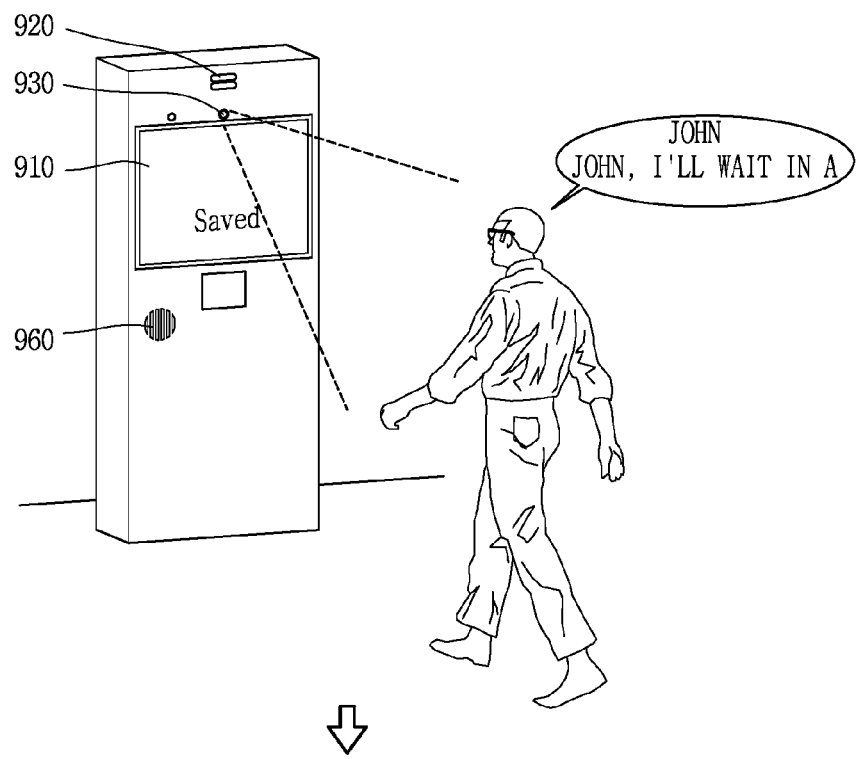
FIGS. 9A and 9B are conceptual views illustrating a system for providing data input to the signage 900, on the basis of unique information.
Figure 9A:
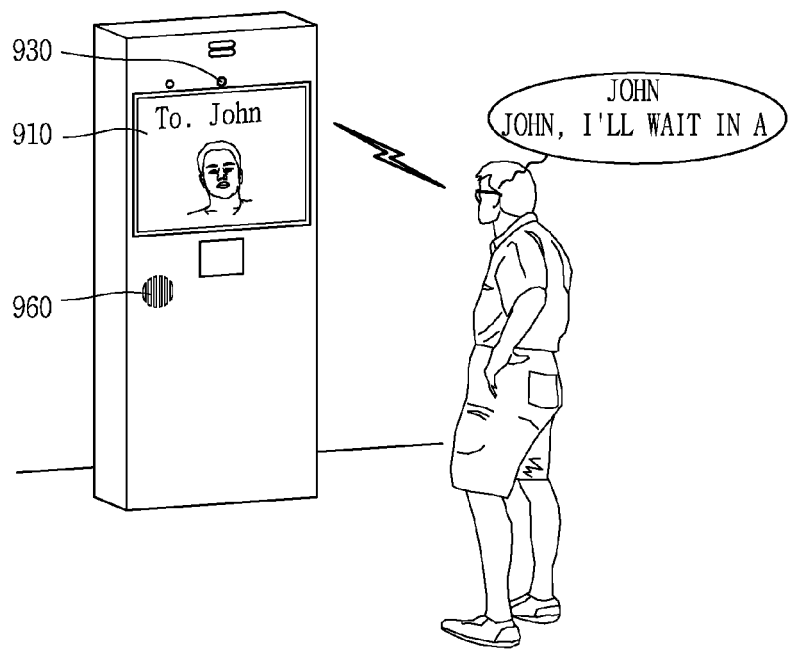
Figure 9B:
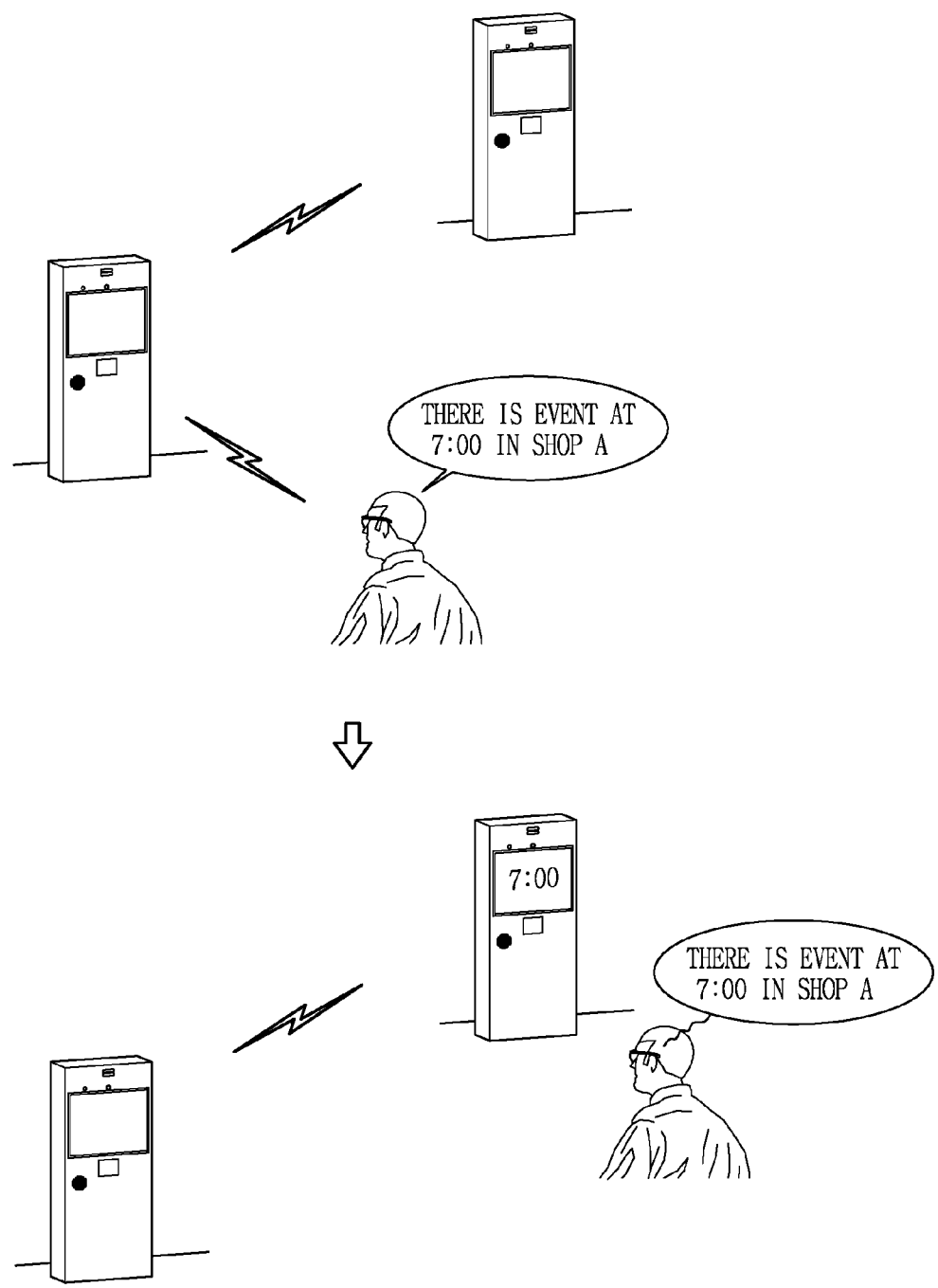

FIGS. 9A and 9B are conceptual views illustrating a system for providing data input to the signage 900 on the basis of unique information.

Referring to FIG. 9A, the signage 900 may receive a user's voice and temporarily store the same. For example, the microphone 960 of the signage 900 may receive a user's voice including unique information of a specific glasses type terminal 400. Here, the unique information may be JOHN.

When the glasses type terminal 400 including the unique information corresponding to JOHN enters the proximity area A, the control unit 180 of the glasses type terminal 400 controls the wireless communication unit 110 to transmit the unique information to the signage 900.

The signage 900 searches for data including the unique information among stored data. The glasses type terminal 400 receives data including the unique information. The control unit controls the output unit 150 to output the data. For example, the control unit 180 may control the speaker 452 to output the data formed as a voice.

Also, while the voice is being recorded, the control unit 180 may output state data which was imaged through the camera 930 together.

A system for providing data through a plurality of signages 900 will be described with reference to FIG. 9B. The user may input a voice to a specific signage 900 and store the same. While the voice is being input, the glasses type terminal 400 may transmit unique information to the signage 900, and the signage 900 stores the data formed as the voice together with information regarding the time and the unique information. The stored data may be transmitted to the signages 900 wirelessly communicate with each other.

For example, in a case in which the glasses type terminal 400 enters a proximity area of the specific signage 900 and transmits the unique information to the specific signage 900, the specific signage 900 provides data stored in the signage 900 to the glasses type terminal 400. That is, the user may be provided with the data stored in the signage 900 of a different area through the different signage 900. The control unit 180 of the glasses type terminal 400 controls the speaker 452 to output the received data.

Meanwhile, in a case in which the data formed as a voice includes information regarding a time, the different signage 900 may transmit the data to the glasses type terminal 400 at the stored time. That is, the signage 900 transmits the data related to the time to the specific signage 900, and when the time arrives, the specific signage 900 may transmit the data to the glasses type terminal 400 which has entered the proximity area of the specific signage 900. Alternatively, in a case in which the glasses type terminal 400 is positioned in a proximity area of the specific signage 900, at least one of the display unit 910 and the speaker 920 of the signage 900 is controlled to output the corresponding information.

For example, in a case in which signages 900 positioned in member stores of different areas wirelessly communicate with each other, when data is input to one signage 900, the data may be substantially simultaneously provided to each of the signages 900.

According to the present embodiment, information collected by any one signage 900 among a plurality of signages 900 positioned in different areas may be output to a set user or a set signage 900 so that data may be more easily transmitted to a user positioned in a different area.

FIGS. 10A to 10F are conceptual views illustrating a system for providing related data using unique information.

Figure 10A:
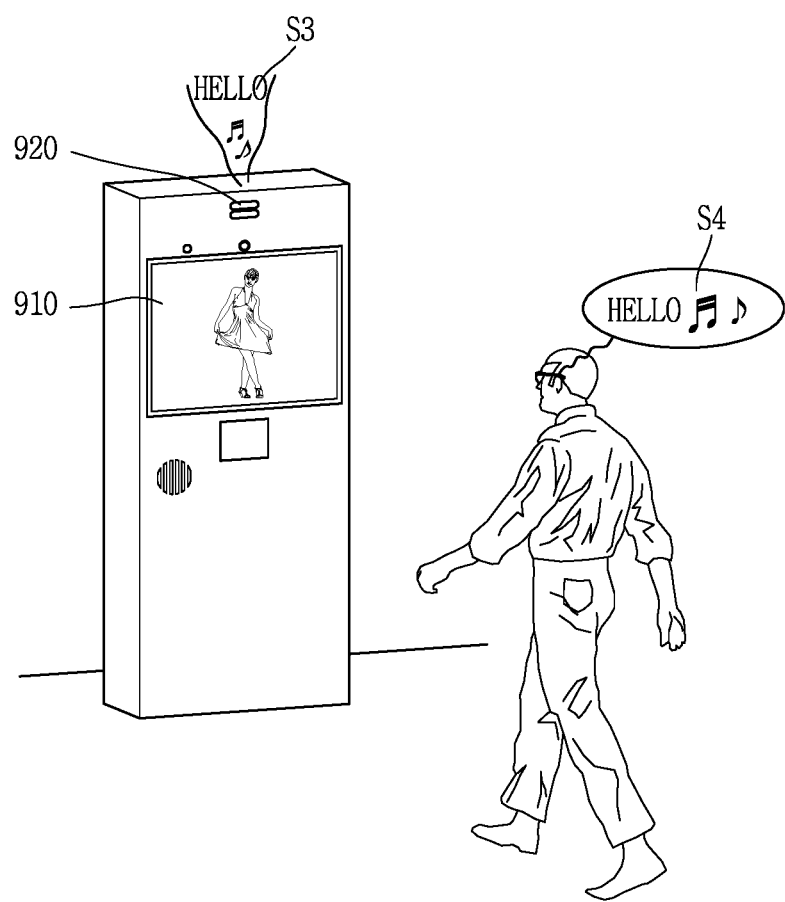
FIGS. 10A to 10F are conceptual views illustrating a system for providing related data using unique information.

Referring to FIG. 10A, visual information is output on the display unit 910 of the signage 900, and first audible information S3 is output from the speaker 920. When the glasses type terminal 400 enters a proximity area A of the signage 900, the wireless communication unit 110 of the glasses type terminal 400 transmits the unique information to the signage 900.

On the basis of the unique information, the signage 900 transmits the related data to the glasses type terminal 400. The related data according to the present invention is second audible information S4. The second audible information S4 is a translation voice obtained by translating the first audible information S3 to a different language.

For example, the unique information may further include set information stored by the user. For example, the set information may be a language of voice data desired to be received, a nationality of the user, age of the user, the user's interest, and the like.

Thus, the user may simultaneously detect the first audible data formed of a different language through the speaker 920 of the signage 900, while being provided with the data in a specific language through the speaker 452 of the glasses type terminal 400.

Also, the control unit 180 controls the speaker 452 to output the related data to correspond to visual information output by the display unit 910 of the signage 900.

Accordingly, the user may be provided with information output from the signage 900 in a manner set by the user or in a desired manner.

Figure 10B:
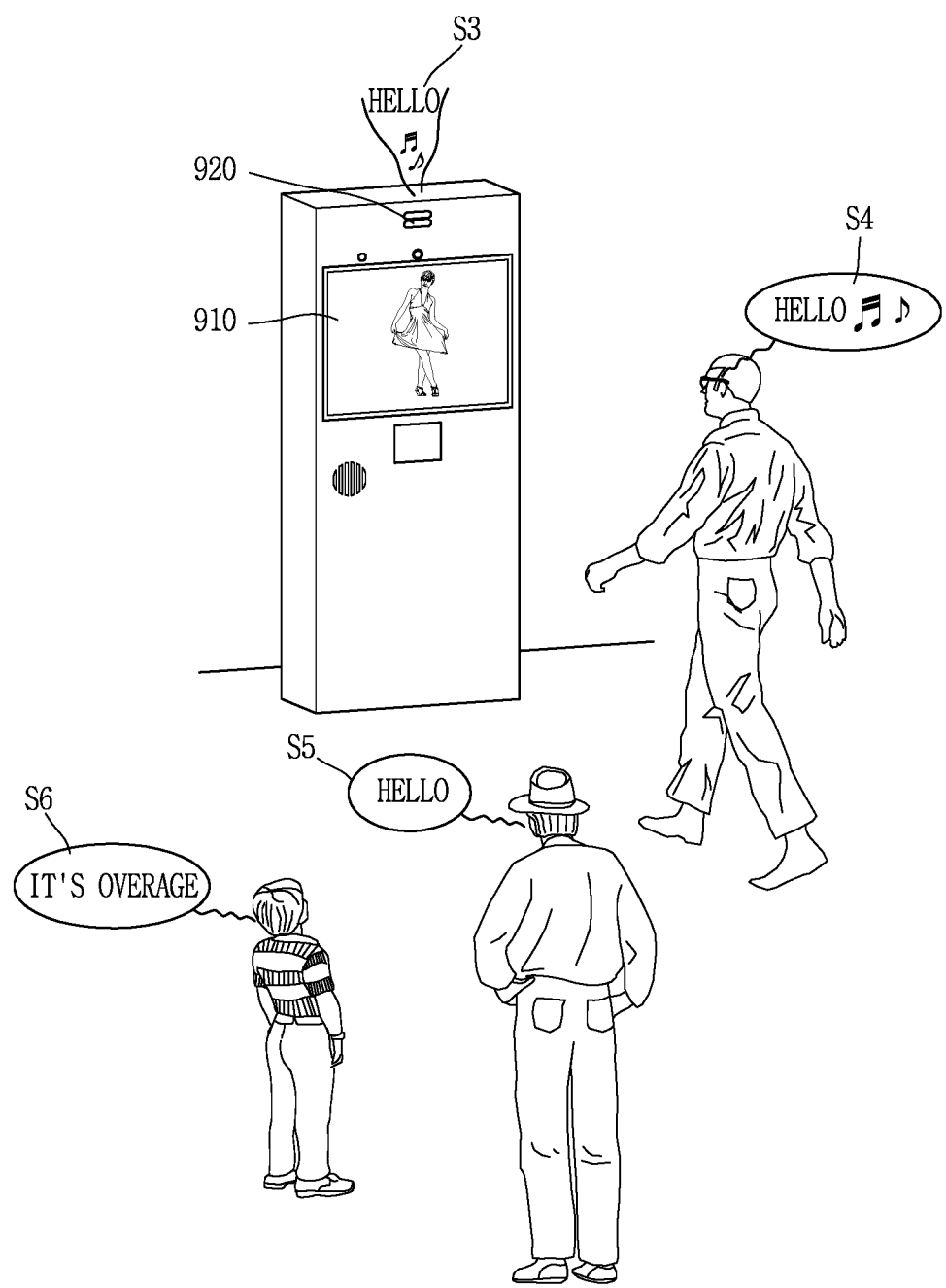

Related data provided according to various users will be described with reference to FIG. 10B. For example, in a case in which an age of the user of the glasses type terminal 400 is stored in the unique information, a sentence forming contents and a voice of the first audible data S3 output from the signage 900 and transformed voice S5 in a changed tone may be provided to the glasses type terminal 400.

For example, in a case in which an advertisement including a voice and an image is output through the display unit 910 and the speaker 920 of the signage 900, the signage 900 may store voice data of different versions on the basis of the unique information. That is, the signage 900 outputs representative voice data among voice data according to a plurality of versions, through the speaker 920 of the signage 900. Also, when the unique information is received, the signage 900 may transmit voice data of a version appropriate for the unique information to the glasses type terminal 400.

Meanwhile, on the basis of the unique information, the glasses type terminal 400 may receive output limitation information unrelated to the first audible information. For example, in a case in which there is a limitation in age in providing the advertisement, an age of the user included in the unique information may correspond to an age in which the advertisement cannot be provided. The wireless communication unit 110 of the glasses type terminal 400 receives the output limitation information S6 and controls the speaker 452 to output the output limitation information S6. For example, the output limitation information S6 may be formed of a voice such as "it's an age limit".

Thus, on the basis of the unique information, audible information appropriate for the users of the respective glasses type terminals 400, and thus, information intended to be provided by the signage 900 may be more effectively transmitted and a specific user may be protected from information.

Figure 10C:
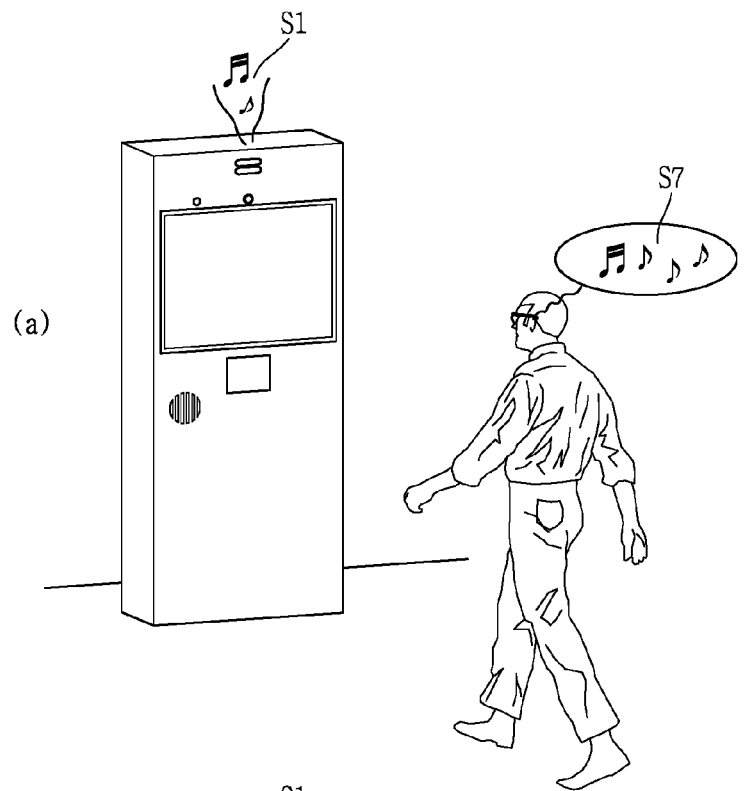
Figure 10C:
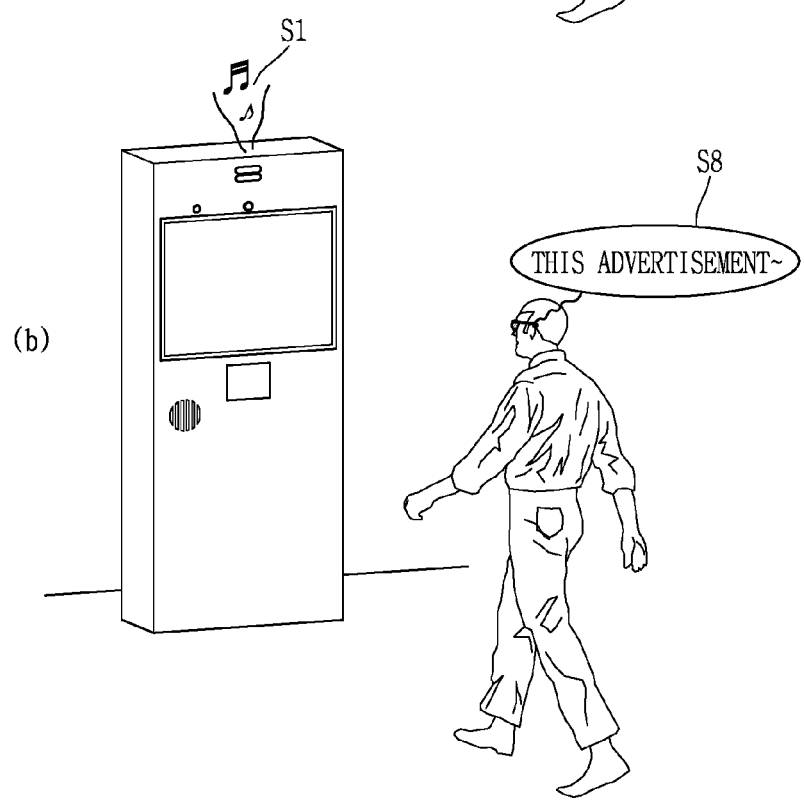

Referring to (a) of FIG. 10C, when the audible information S1 is output from the speaker 920 of the signage 900 and the glasses type terminal 400 enters the proximity region A, the glasses type terminal 400 transmits the unique information to the signage 900.

The signage 900 transmits first additional data S7 on the basis of the unique information. The control unit 180 controls the speaker 452 to output the first additional data S7. Here, the first additional data S7 may be music data generating a certain effect when it is listened together with the audible information S1.

For example, the audible information S1 may be monotonous music information which may not be considered noise to people, and the first additional data S7 may be music data in harmony with the audible information S1. When the audible information is a melody, the first additional data S7 may be accompaniment music in harmony with the melody. Alternatively, the audible information S1 and the first additional data S7 may be a melody and a song, respectively.

Referring to (b) of FIG. 10C, the signage 900 transmits second additional data S8 on the basis of the received unique information. Here, the unique information may include information regarding an area of interest set by the user.

When the currently output visual information and the audible information is an area of interest of the user on the basis of the unique information, the signage 900 transmits the second additional data S8 to the glasses type terminal 400.

For example, in a case in which the signage 900 outputs an advertisement including visual information and audible information, the audible information S1 may be music information and the second additional data S8 may be voice information regarding the advertisement.

That is, people passing by the front side of the signage 900 and a user of the glasses type terminal 400 which has transmitted unique information but an output advertisement does not correspond to an area of interest of the user are provided with only the music information. Also, only a user of the glasses type terminal 400 which has transmitted unique information and the advertisement corresponds to an area of interest of the user may be provided with the second additional data S8 including specific information regarding the advertisement.

Thus, noise regarding an advertisement output from the signage 900 may be minimized and voice information may be provided only to a user who wants contents of the advertisement. Thus, efficiency of the advertisement output from the signage 900 may be enhanced, while a problem of the signage 900 is minimized.

Figure 10D:
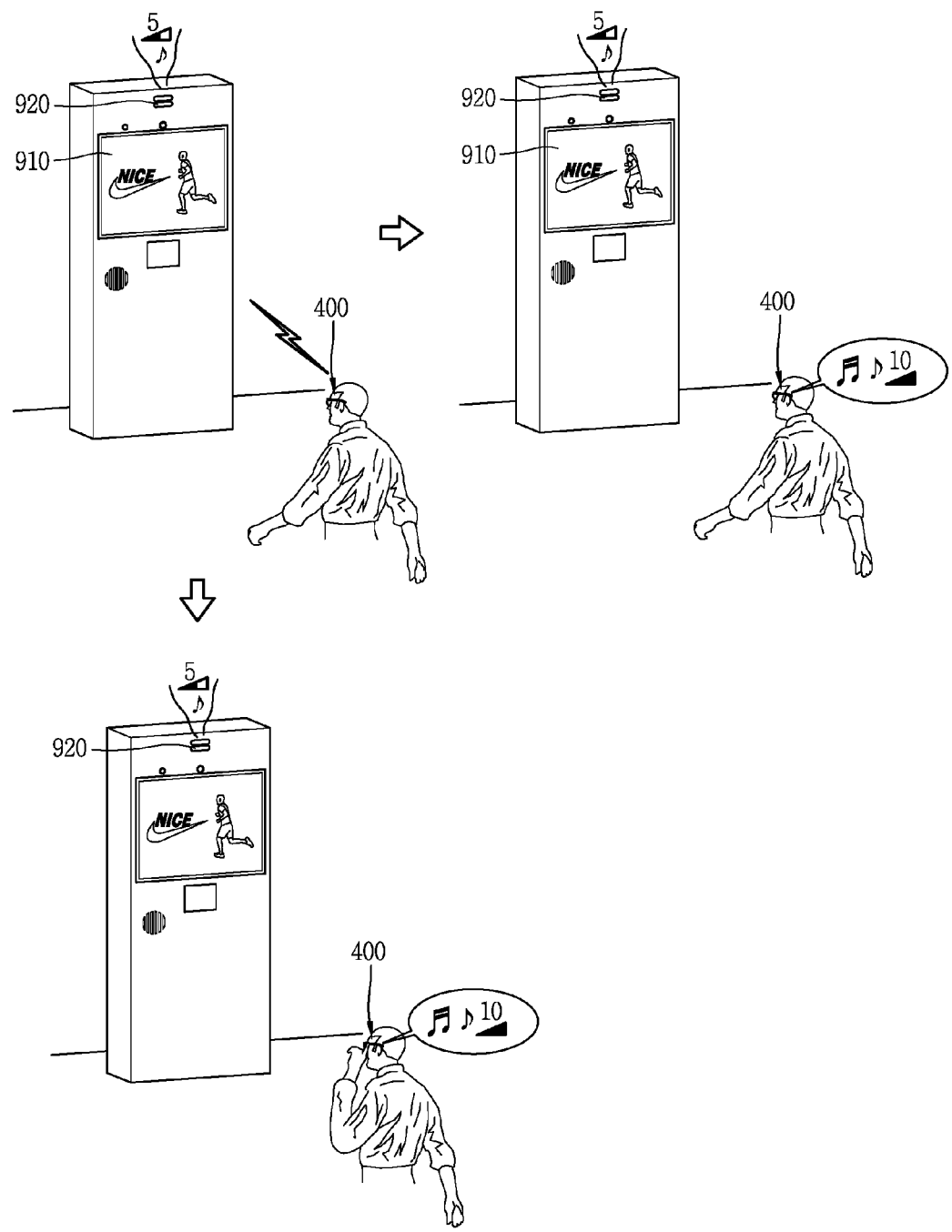

A system for providing audible data with adjusted sound volume will be described with reference to FIG. 10D. The speaker 920 of the signage 900 outputs the audible information with a preset sound volume (Volume 5). When the glasses type terminal 400 enters the proximity area A, the signage 900 transmits audible data set to be output with a different sound volume (Volume 10) to the glasses type terminal 400.

Here, the preset sound volume may be set to a sound volume of information not recognized as noise to people compared with a degree of noise of an area where the signage 900 is positioned. Also, the other sound volume may be set to a sound volume of a degree to which accurate information may be provided to the user, compared with a degree of noise in an area in which the signage 900 is positioned.

That is, when the glasses type terminal 400 enters the proximity area A of the signage 900, the glasses type terminal 400 receives the audible data provided with a high sound volume. That is, the user may be simultaneously provided with the audible data output by the speaker 252 and visual information output by the display unit 910 of the signage 900.

Meanwhile, the control unit 180 may control the speaker 452 to output the received audible data on the basis of a control command applied to a user input unit 423b. Alternatively, the control unit 180 may control the wireless communication unit 110 to receive the audible data from the signage 900 on the basis of a control command applied to the user input unit 423b.

According to an embodiment of the present invention, a problem in which audible information output from the signage 900 is noise to those who do not want the information is minimized, and accurate information may be provided to a person who wants the information by using the glasses type terminal 400 worn on user's face in real time without performing a control operation.

Figure 10E:
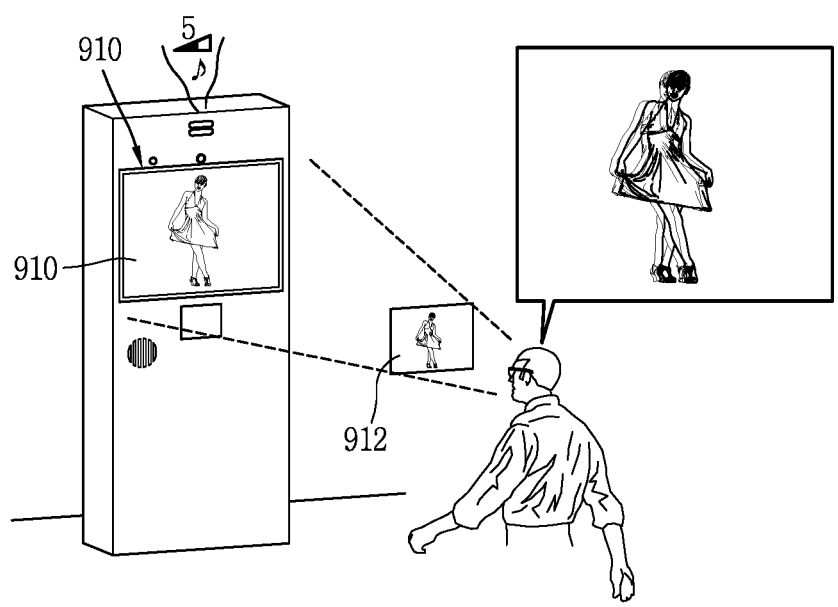

A control method for providing a stereoscopic image will be described with reference to FIG. 10E. The display unit 910 of the signage 900 outputs a first frame image 911. When the glasses type terminal 400 enters the proximity area A, the glasses type terminal 400 may be provided with a second frame image 912 corresponding to the first frame image 911. The control unit 180 controls the display unit 451 to output the second frame image 912. Here, the first and second frame images may be a left eye image and a right eye image, respectively.

That is, the first and second frame images 911 and 912 may overlap each other and may be output to form a 3D stereoscopic image. That is, even though the display unit 910 of the signage 900 outputs a planar image, the user of the glasses type terminal 400 may be provided with a stereoscopic image.

Figure 10F:
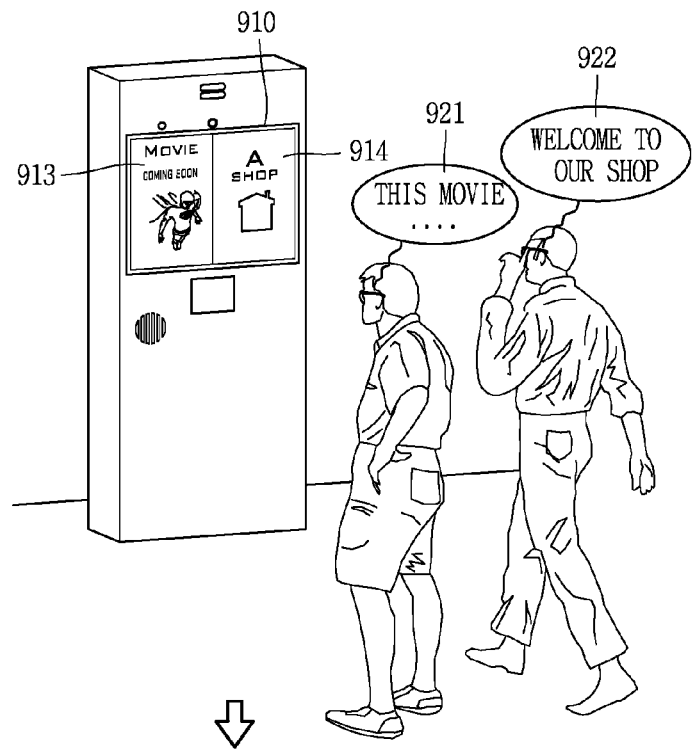
Figure 10F:
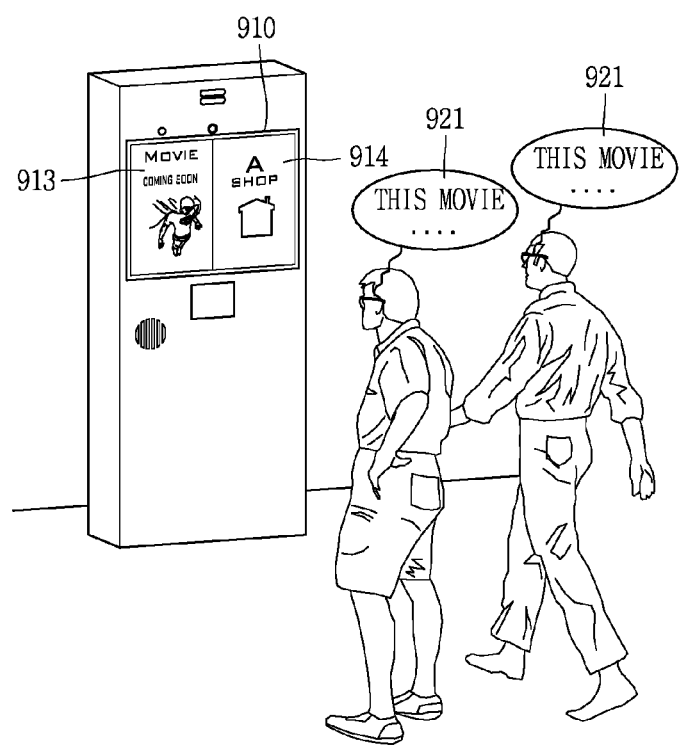

A control method for selectively providing audible data corresponding to information to the user in a case in which the signage 900 simultaneously provides a plurality of pieces of information will be described with reference to FIG. 10F.

The display unit 910 of the signage 900 simultaneously outputs first and second visual information 913 and 914. The first and second visual information 913 and 914 may be images of different advertisements.

When the glasses type terminal 400 enters the proximity area A of the signage 900, the glasses type terminal 400 transmits the unique information to the signage 900. The signage 900 transmits one of first and second audible data 921 and 922 corresponding to the first and second visual information 913 and 914, respectively, to the glasses type terminal 400 on the basis of the unique information.

Meanwhile, when the unique information is not received or when audible data is not selected on the basis of the unique information, the signage 900 may transmit certain audible data.

That is, in a case in which users of a plurality of glasses type terminals 400 are positioned in front of the signage 900, the plurality of users may view the display unit 910 of the signage 900 together but may be provided with different audible data.

Meanwhile, the glasses type terminal 400 may control the wireless communication unit 110 and the speaker 452 to output different audible data on the basis of a control command applied to the user input unit 423b.

That is, in a case in which the signage 900 outputs a plurality of advertisements, the user may be selectively provided with audible data to receive only desired information. Thus, the user may be selectively provided with only desired information, while kinds of advertisement through the signage 900 are increased.

Figure 11A:
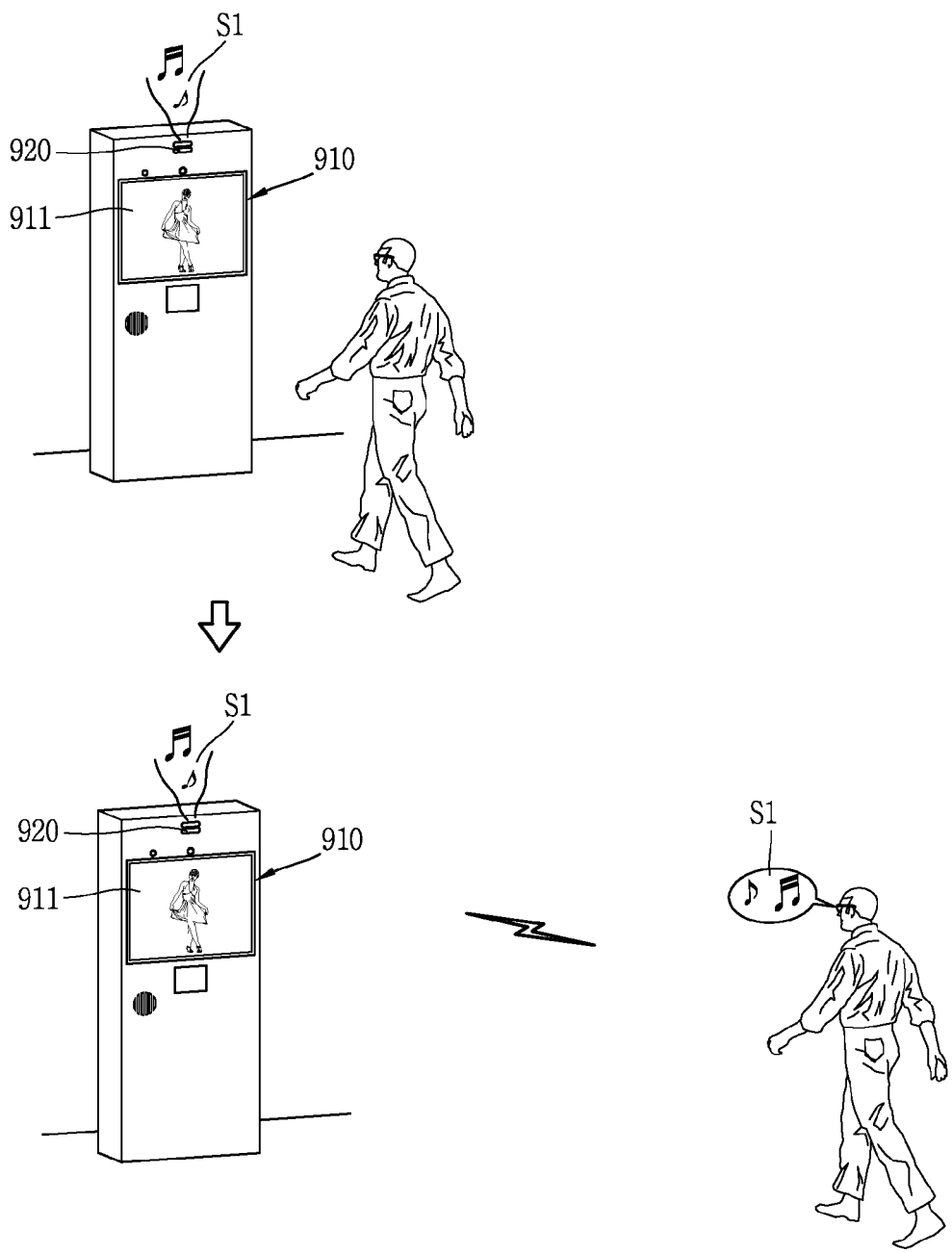
FIGS. 11A to 11C are conceptual views illustrating a control method for providing data to the glasses type terminal 400 sensed by a camera.
Figure 11B:
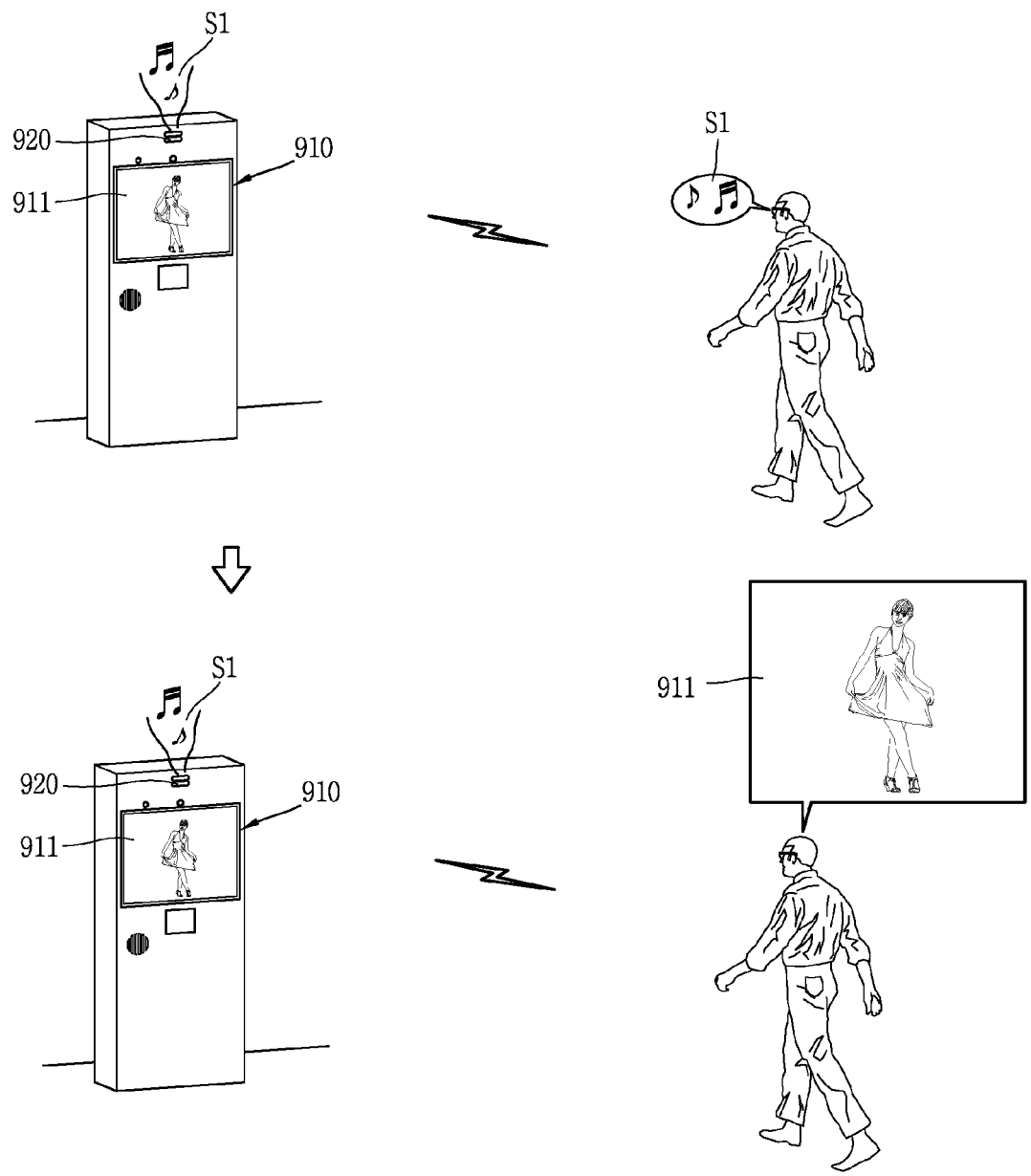
Figure 11C:
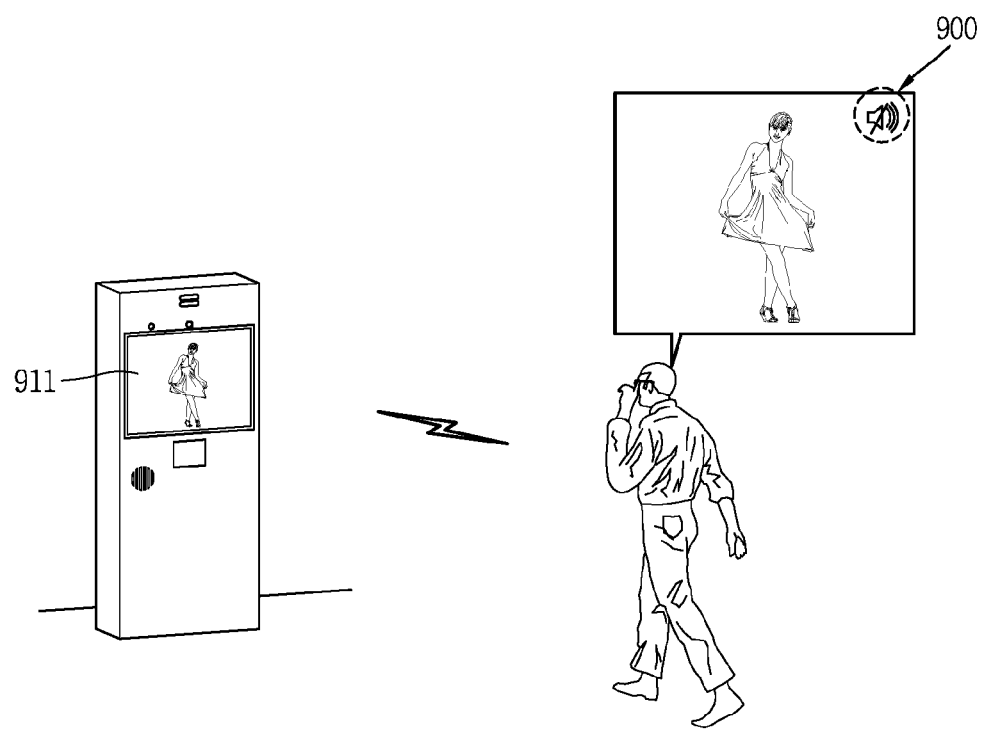
Figure 11C:
Figure 11C:
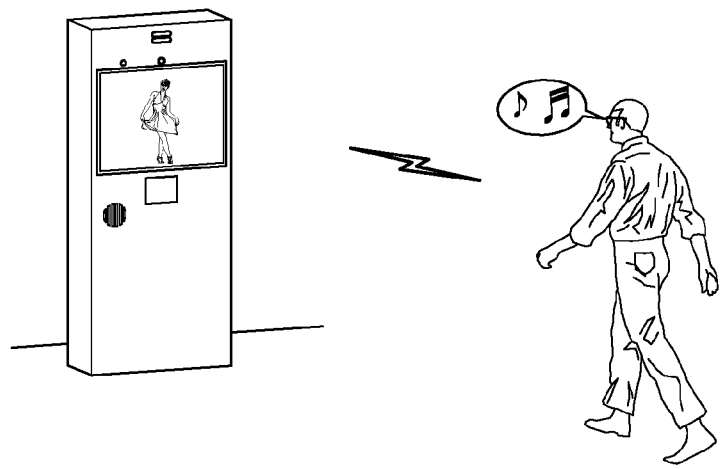

FIGS. 11A to 11C are conceptual views illustrating a control method for providing data to the glasses type terminal 400 sensed by a camera.

Referring to FIGS. 11A and 11B, the signage 900 may output visual information 911 through the display unit 910 and provides audible information S1 through the speaker 920. While the visual information 911 and the audible information S1 are being output, the signage 900 interrupts transmission of data in a case in which the glasses type terminal 400 is positioned within a preset distance (which may be the proximity area A but the present invention is not limited thereto).

However, in a case in which the glasses type terminal 400 is not positioned within the preset distance but sensed by the camera 930 of the signage 930, the signage 900 may transmit at least one of the visual information 911 and the audible information S1 as data.

Alternatively, in a case in which the signage 900 sensed by the camera 421 of the glasses type terminal 400 is present at a position spaced apart from the glasses type terminal 400 by a preset distance and sensed for a preset period of time, the control unit 180 controls the wireless communication unit to receive data related to information output by the signage 900. That is, when the signage 900 is sensed by the camera 421 for the preset period of time, it is determined that the user gazes at the signage 900 for the preset period of time. Also, in a case in which when the user is positioned at a distance where it is difficult to clearly recognize information output from the signage 900 disposed at a fixed position, the information output from the signage 900 may be provided to the user.

The provided data among the visual information 911 and the audible information S1 may be selected according to a user setting or a control command. Alternatively, in a case in which the visual information 911 is not clearly sensed by the camera 421, the visual information 911 may be received.

A control method for outputting an icon indicating an output state of audible data will be described with reference to FIG. 11C. The signage 900 may limit output of audible information through the speaker 920.

When the glasses type terminal 400 enters the proximity area A of the signage 900, the glasses type terminal 400 is provided with data of audible information corresponding to the visual information 911 output from the signage 900.

However, in a case in which output of the data received on the basis of a user setting or a control command input by the user is limited, the control unit 180 controls the display unit 451 to output an icon 500 indicating an output state of the data. For example, the icon 500 may have a shape indicating a mute state, but the present invention is not limited thereto.

That is, in a case in which audible data is not output although the user enters the proximity area A of the signage 900, the user may recognize whether the signage 900 does not provide data (the icon 500 is not output) or whether output of data is limited by the user (the icon 500 is output on the display unit 451).

In a state in which the icon 500 is output on the display unit 451, when a control command is input to the user input unit 423b, the control unit may control the speaker 452 to output the data.

In this manner, the signage 900 may limit output of audible information intended to be provided, solving the problem in which the audible information is noise to those who do not want information, and selectively provide data only to the user who wants to receive the audible information to the glasses type terminal 400.

Figure 12A:
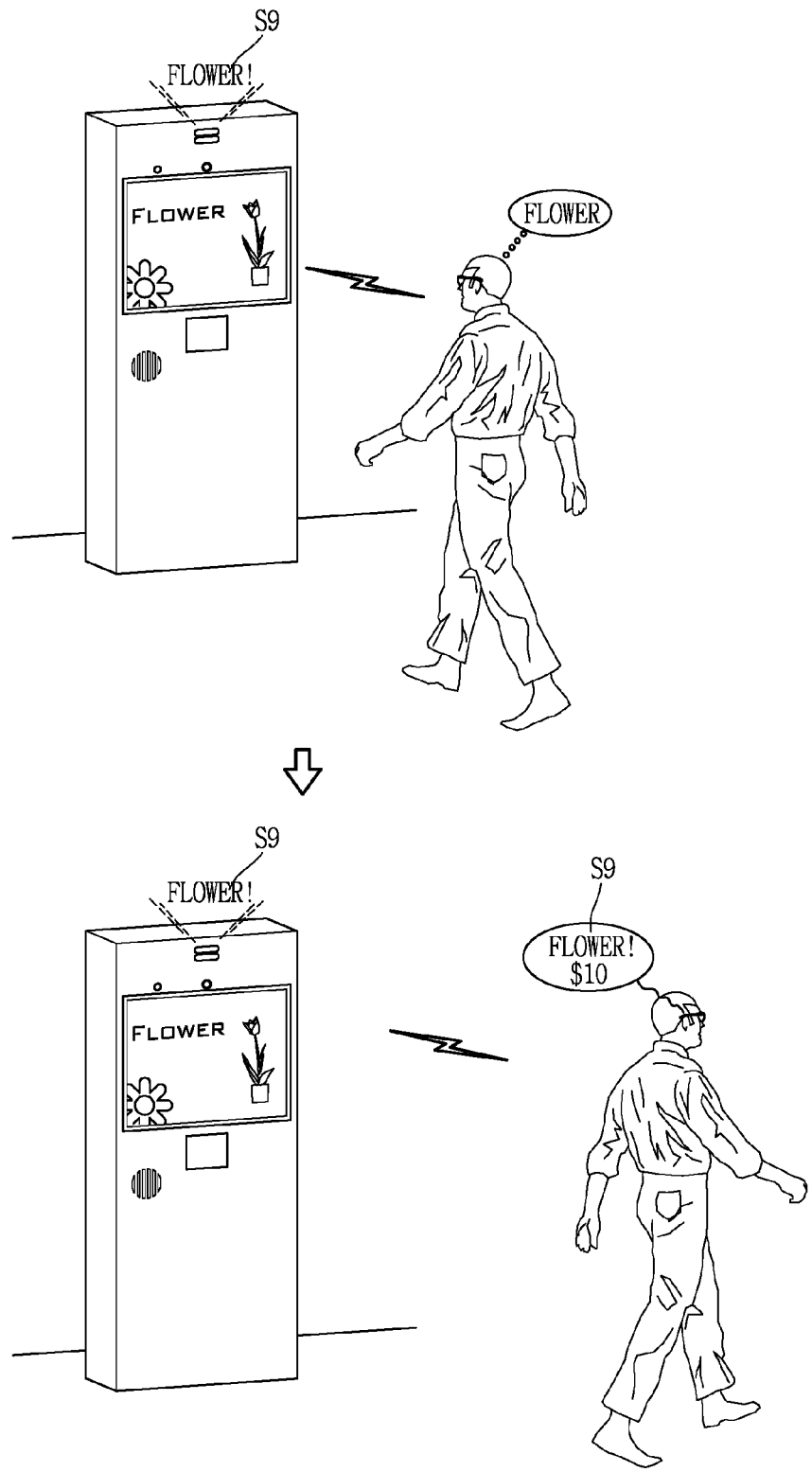
FIGS. 12A to 12C are conceptual views illustrating a control method for providing data to the glasses type terminal moving in front of a signage.
Figure 12B:
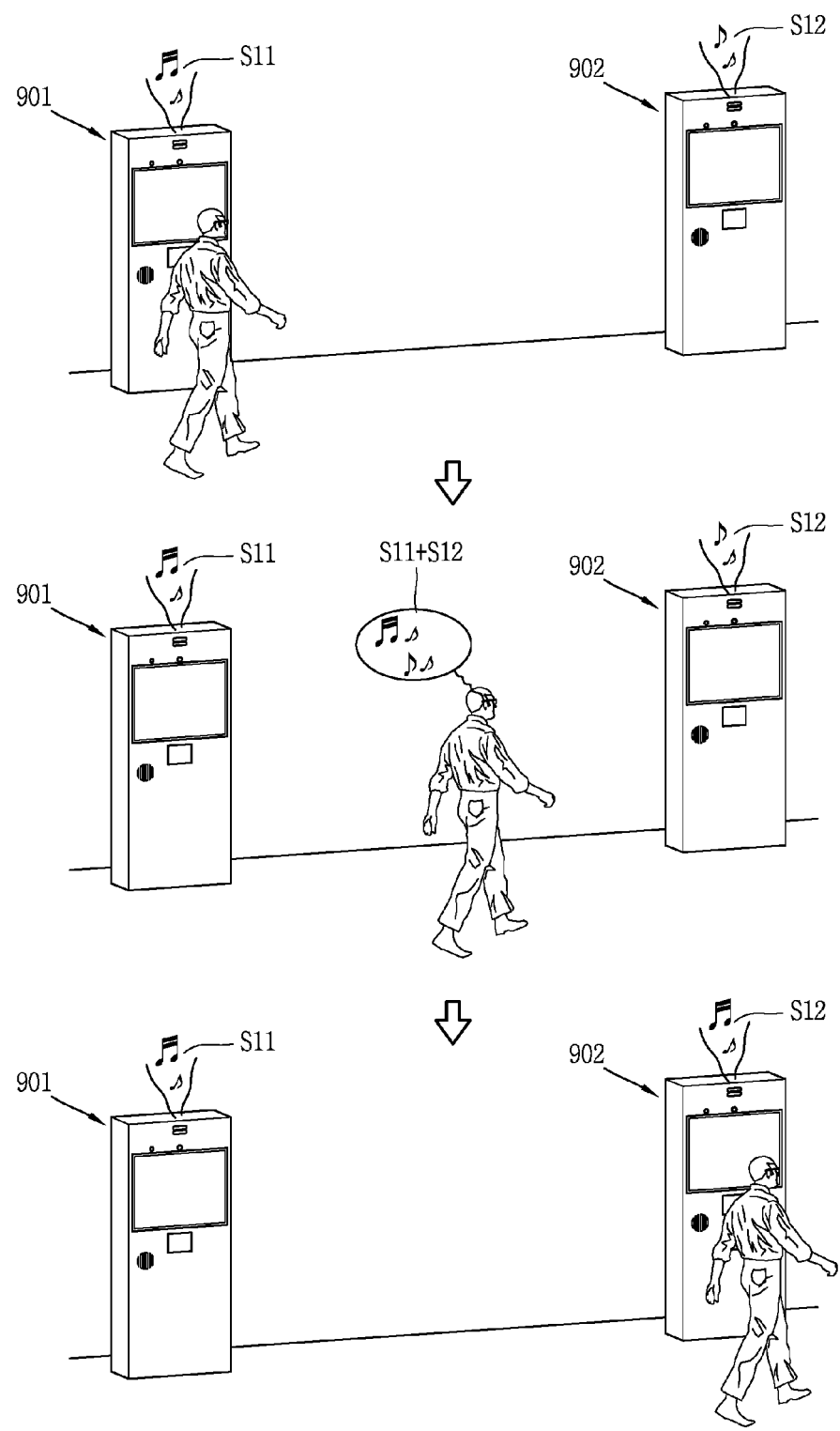
Figure 12C:
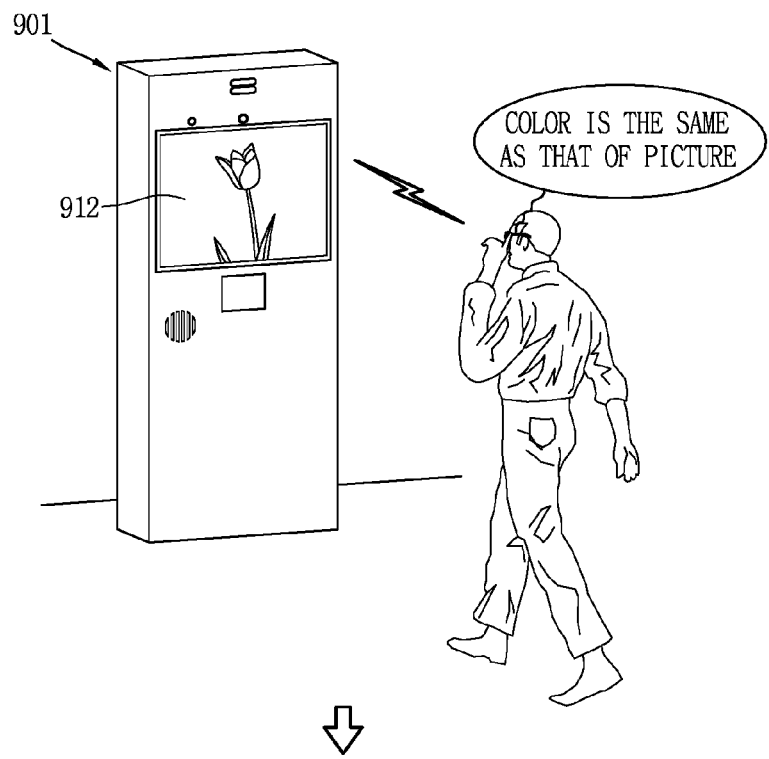
Figure 12C:
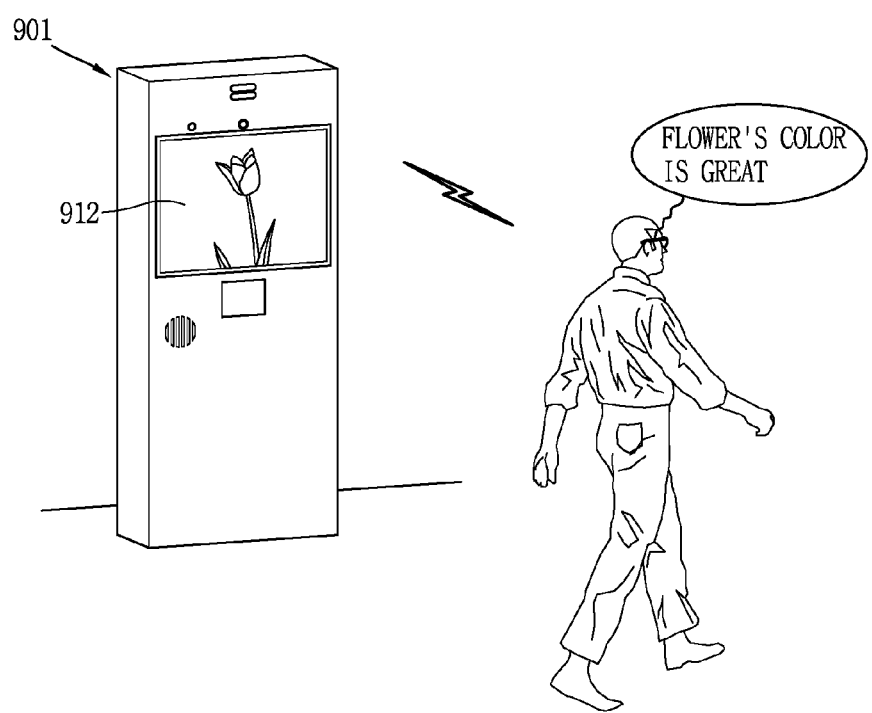

FIGS. 12A to 12C are conceptual views illustrating a control method for providing data to the glasses type terminal 400 moving in front of a signage.

A control method for providing data to the glasses type terminal 400 which moves to become away from a signage will be described. The speaker 920 of the signage 900 outputs audible information S9. When the glasses type terminal 400 enters the proximity area A of the signage 900, the glasses type terminal 400 transmits unique information thereof.

When the user wearing the glasses type terminal 400 moves away from the signage 900 (or when the user wearing the glasses type terminal 400 moves out of the proximity area A), the signage 900 may provide the audible information S9 as data to the glasses type terminal 400.

However, only when the information output from the signage 900 is determined as interested information of the user on the basis of the unique information, the signage 900 may provide the audible information S9.

Also, in a case in which the signage 900 is not sensed by the camera 421, that is, when the user's eyes are drawn to the signage 900, the control unit 180 may control the speaker 452 to output the audible information S9.

That is, even though the user moves away from the signage 900 so the user is not provided with information any longer, if information is anticipated to be required for the user, the information may be continuously provided.

A control method of the glasses type terminal 400 passing by a plurality of signages 900 outputting audible information will be described with reference to FIG. 12B. Referring to FIG. 12B, the user who wears the glasses type terminal 400 may sequentially move in front of the plurality of signages.

For example, the user who wears the glasses type terminal 400 may pass by first and second signages 901 and 902 disposed at a preset interval. The first and second signages 901 and 902 output first and second audible information S11 and S12, respectively.

When the glasses type terminal 400 is positioned between the first and second signages 901 and 902, the first and second signages 901 and 902 output the first and second audible information S11 and S12.

For example, in a case in which the glasses type terminal 400 is positioned in the proximity area A of the first signage 901, the glasses type terminal 400 receives data regarding the first audible information S11 from the first signage 901. In a case in which the glasses type terminal 400 moves out of the proximity area A of the first signage 901, the control unit 180 controls the speaker 452 to output the first audible information S11. The control unit 180 may control the speaker 452 such that a sound volume of the first audible information S11 is output to be decreased as the glasses type terminal 400 moves away from the first signage 901.

Meanwhile, in a case in which the second signage 902 is sensed by the camera 421, the control unit 180 control the wireless communication unit to receive data of the second audible information S12 from the second signage 902.

When the data of the second audible information S12 is received, the control unit 180 may control the speaker 452 to output both the first and second audible information S11 and S12. Also, the control unit 180 may control the speaker 452 to increase a sound volume at which the second audible information S12 is output as the glasses type terminal 400 moves toward the second signage 902.

That is, while the glasses type terminal 400 is positioned between the first and second signages 901 and 902, the control unit 180 continuously provides the first and second audible information S11 and S12. Accordingly, even when the user is positioned at a distance spaced apart from the first and second signages 901 and 902, the user may feel that sounds output from the respective signages are naturally connected. Thus, inconvenience that sensing of a sound provided from the signages is interfered with by noise generated outside may be resolved.

However, the method for adjusting a sound volume of the first and second audible information S11 and S12 is not limited thereto. For example, the speaker may adjust the sound volume of the first audible information to be greater and the sound voltage of the second audible information S12 to be smaller as the glasses type terminal 400 is positioned to be close to the second signage 902.

When the glasses type terminal 400 enters a proximity area A of the second signage 902, the control unit 180 may control the speaker 452 to limit output of the first audible information S11.

A control method for outputting audible data of different versions according to a user's gaze will be described with reference to FIG. 12C. The control unit 180 may determine whether the user's gaze moves by the camera 421 of the glasses type terminal 400. The control unit 180 receives audible data of different versions on the basis of the user's gaze and controls the glasses type terminal 400 to output the received audible data.

Referring to FIG. 12C, the display unit 910 of the signage 900 outputs a preset image 912. The image 912 may correspond to audible information according to a plurality of versions.

For example, the control unit 180 determines whether the signage 900 is sensed by the camera 421 of the glasses type terminal 400. When the user's gaze faces the display unit of the signage 900, the control unit 180 controls the wireless communication unit to receive audible information T1 of the first version and controls the speaker 452 to output the audible information T1 of the first version.

However, the present invention is not limited thereto and, when the glasses type terminal 400 is positioned in the proximity area A of the signage 900, the control unit 180 may control the speaker 452 to receive pieces of audible information of different versions and selectively output the same.

For example, the audible information T1 of the first version may be configured as contents understood when the user senses the image 912. That is, the audible information T2 of the second version includes information included in the image 912.

Meanwhile, when it is sensed by the camera 421 that the user's gaze moves out of the signage 900, the control unit 180 may control the speaker 452 to output the audible information T2 of the second version. The audible information T2 of the second version is configured as contents that can be recognized by the user without viewing the image 912.

That is, the image 912, the audible information T1 of the first version, and the audible information T2 of the second version may include information of the substantially same contents.

According to the present embodiment, when the user is positioned in proximity to the signage 900 but does not view the display unit 910, the corresponding situation may be sensed to effectively transmit an advertisement, or the like, even without an image output on the display unit 910.

Figure 13:
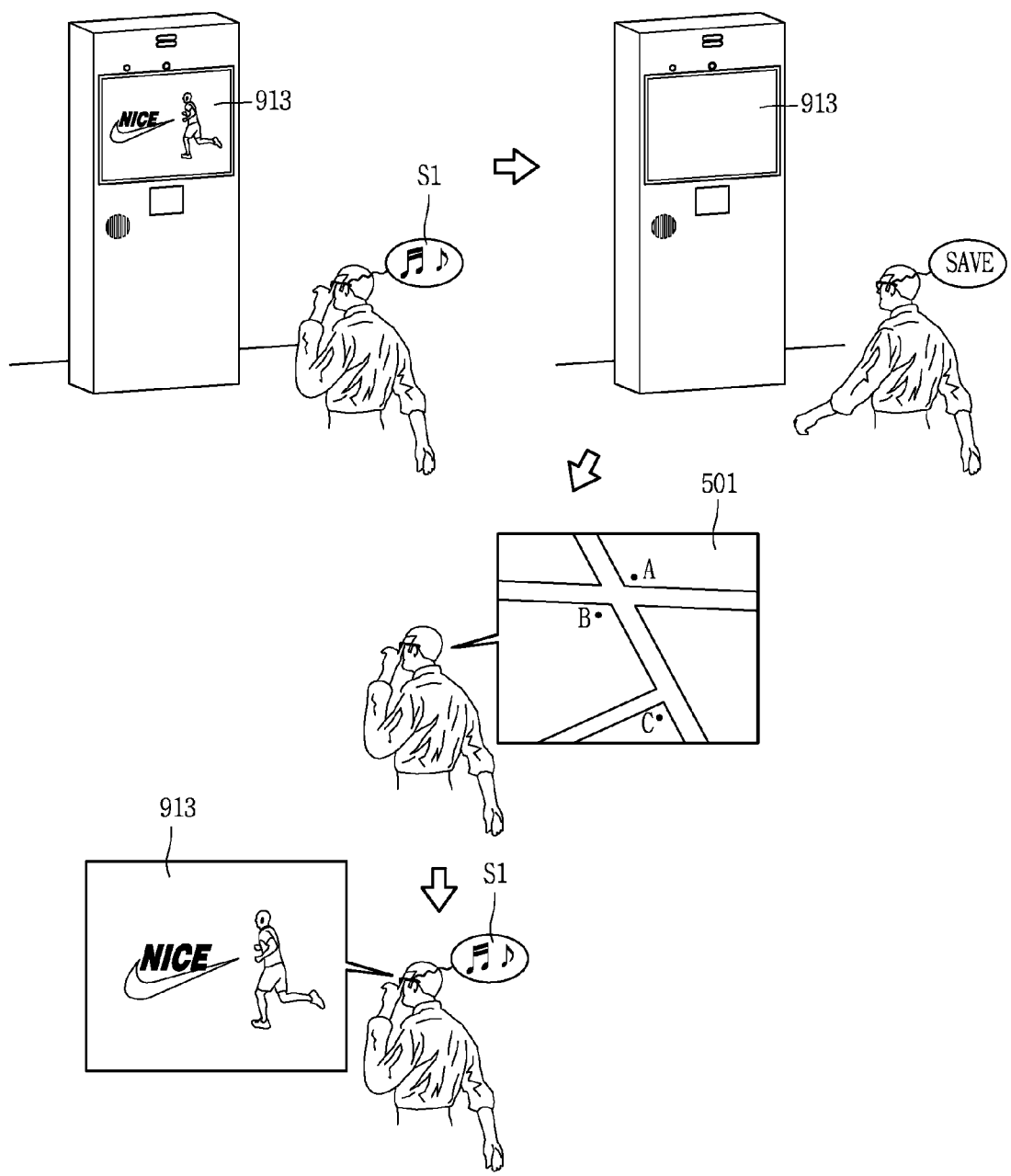
FIG. 13 is a conceptual view illustrating a control method for storing a signage 900 which has been provided.

FIG. 13 is a conceptual view illustrating a control method for storing the signage 900 which was provided.

The signage 900 outputs visual information through the display unit 910 and provides audible information S1 through the speaker 452 of the glasses type terminal 400. The glasses type terminal 400 controls the memory 170 to store at least one of the visual information 913 and the audible information S1 on the basis of a control command input to the user input unit 423b. Also, the control unit may store position information of the signage together with the information. For example, the control unit 180 may capture visual information 913 output on the display unit 910 by the camera 421 and store the same.

Meanwhile, the control unit 180 may control the wireless communication unit 110 to receive data regarding the information from the signage 900 on the basis of a control command from the user for storing the same.

The control unit 180 may receive the stored information again on the basis of a control command input to the user input unit 423b. For example, the control unit 180 may control the display unit 451 to output a map image 501 indicating a position of the signage 900 storing specific information. However, in a case in which a source of stored information is a single signage 900, output of the map image 501 may be omitted.

Also, the control unit may store at least one of the visual information and the audible information even when there is no control command from the user.

The control unit 180 controls the display unit 451 and the speaker 452 to output again the visual information 913 and the audible information S1 stored in a position selected by the user.

Accordingly, the user may simply store desired information and may be provided with the stored information again.

As for the glasses type terminal described above, the configurations and methods of the embodiments of the present invention described above are not limited in its application, but the entirety or a portion of the embodiments may be selectively combined to be configured into various modifications.

The present embodiments related to a glasses type terminal wirelessly communicating with a digital signage, providing data desired by a user, and thus, the present embodiments may be applied to various industrial fields related thereto.

The invention claimed is:

1. A glasses type terminal, comprising:
   a wireless communication unit configured to wirelessly communicate with a digital signage collecting state information of a proximity area; and
   a controller configured to:
   transmit a control command via the wireless communication unit based on history information recorded in the glasses type terminal when the glasses type terminal is positioned in the proximity area,
   receive, from the digital signage, a response corresponding to a specific state information selected from the state information based on the control command, and
   output information corresponding to the received response.

2. The glasses type terminal of claim 1, wherein the state information comprises a noise state of the proximity area, the response is audible data canceling out the noise state, and the glasses type terminal further comprises a speaker configured to output the audible data.

3. The glasses type terminal of claim 1, wherein the state information is an image obtained by imaging a proximity area including the glasses type terminal, and the response corresponds to at least one region of the visual information.

4. The glasses type terminal of claim 3, further comprising:
   a camera configured to image an external environment in a direction of a user's gaze,
   wherein the controller is further configured to transmit, via the wireless communication unit, information regarding one region of the visual information not sensed by the camera to the digital signage.

5. The glasses type terminal of claim 3, wherein when audible information is output from the digital signage, the response is the audible information transmitted on the basis of the image, and the controller is further configured to output the audible information.

6. A wireless communication system comprising:
   a digital signage defining a preset proximity area and collecting state information of the proximity area;
   a glasses type terminal entering the proximity area and performing wireless communication with the digital signage, and transmitting a control command via a wireless communication unit, based on history information recorded in the glasses type terminal in response to the glasses type terminal entering the proximity area; and
   a communication unit transmitting data transmitting a response corresponding to a specific state information selected from the state information based on the control command, from the digital signage to the glasses type terminal.

7. The wireless communication system of claim 6, wherein the digital signage includes at least one of a camera imaging an external environment, a microphone sensing ambient noise, a humidity sensor sensing humidity, a temperature sensor measuring a temperature, and an illumination sensor sensing incident light.

8. The wireless communication system of claim 7, wherein when the digital signage outputs audible information, if the ambient noise is sensed to have a preset sound volume or greater, the response corresponds to the audible information.

9. The wireless communication system of claim 7, wherein when the digital signage outputs visual information, if a portion of the glasses type terminal included in the image is covered by an object, the response corresponds to at least one region of the visual information.

10. The wireless communication system of claim 6, wherein the digital signage includes a location information module sensing an area in which the digital signage is positioned, and the digital signage wirelessly communicates with another digital signage positioned in an area spaced apart from the digital signage to transmit the state information and position information.

11. The wireless communication system of claim 6, wherein the glasses type terminal includes unique information formed by a user and transmits the unique information to the digital signage, and the digital signage transmits a portion of the state information to the glasses type terminal by using the unique information.

* * * * *